(12) United States Patent
Billsröm et al.

(10) Patent No.: US 8,099,605 B1
(45) Date of Patent: Jan. 17, 2012

(54) INTELLIGENT STORAGE DEVICE FOR BACKUP SYSTEM

(75) Inventors: Leif Olov Billsröm, Alnö (SE); Kurt Uno Lennartsson, San Jose, CA (US)

(73) Assignee: InventSec AB (SE)

( * ) Notice: Subject to any disclaimer, the term of this patent is extended or adjusted under 35 U.S.C. 154(b) by 1215 days.

(21) Appl. No.: 11/809,845

(22) Filed: Jun. 1, 2007

Related U.S. Application Data

(60) Provisional application No. 60/811,233, filed on Jun. 5, 2006.

(51) Int. Cl.
*G06F 7/04* (2006.01)
*G06F 21/00* (2006.01)
*H04L 29/06* (2006.01)

(52) U.S. Cl. ............................. 713/187; 713/193; 726/28
(58) Field of Classification Search .............. 726/26–28; 713/165, 167, 187, 189, 193
See application file for complete search history.

(56) References Cited

U.S. PATENT DOCUMENTS

| | | | |
|---|---|---|---|
| 5,742,807 A | 4/1998 | Masinter | |
| 6,463,535 B1 * | 10/2002 | Drews | 713/176 |
| 6,983,365 B1 | 1/2006 | Douceur et al. | |
| 7,003,672 B2 | 2/2006 | Angelo et al. | |
| 7,143,445 B1 * | 11/2006 | Ishiguro et al. | 726/31 |
| 7,155,745 B1 * | 12/2006 | Shin et al. | 726/27 |
| 2002/0038296 A1 | 3/2002 | Margolus et al. | |
| 2003/0021417 A1 | 1/2003 | Vasic et al. | |
| 2003/0028761 A1 | 2/2003 | Platt | |
| 2003/0188180 A1 * | 10/2003 | Overney | 713/193 |
| 2004/0022390 A1 | 2/2004 | McDonald et al. | |
| 2004/0148306 A1 | 7/2004 | Moulton et al. | |
| 2004/0168058 A1 | 8/2004 | Margolus et al. | |
| 2004/0193904 A1 * | 9/2004 | Asoh et al. | 713/193 |
| 2004/0236761 A1 | 11/2004 | Both | |
| 2005/0027757 A1 | 2/2005 | Kiessig et al. | |
| 2005/0076066 A1 | 4/2005 | Stakutis et al. | |
| 2005/0108240 A1 | 5/2005 | Bolosky et al. | |
| 2005/0131939 A1 | 6/2005 | Douglis et al. | |
| 2005/0131961 A1 | 6/2005 | Margolus et al. | |
| 2005/0132382 A1 | 6/2005 | McGuire et al. | |
| 2005/0177603 A1 | 8/2005 | Shavit | |
| 2005/0195660 A1 * | 9/2005 | Kavuri et al. | 365/189.05 |
| 2005/0226059 A1 | 10/2005 | Kavuri et al. | |
| 2008/0059495 A1 * | 3/2008 | Kiessig et al. | 707/100 |
| 2008/0294860 A1 * | 11/2008 | Stakutis et al. | 711/162 |
| 2009/0178144 A1 * | 7/2009 | Redlich et al. | 726/27 |

OTHER PUBLICATIONS

"How Rsync Works A Practical Overview," http://web.archive.org/web/20060210112620/http:/rsync.samba.org/how-rsync-works.html, Accessed Oct. 27, 2010, 5 pages.

* cited by examiner

*Primary Examiner* — Gilberto Barron, Jr.
*Assistant Examiner* — Abdulhakim Nobahar
(74) *Attorney, Agent, or Firm* — Blakely, Sokoloff, Taylor & Zafman LLP; Judith A. Szepesi

(57) ABSTRACT

A data storage and data backup device that offers automatic reduction of duplicate data storage, and that easily can be connected to computing devices, computing systems and networks of computing devices. The device offers high protection against destruction or modification of already stored data, and requires flipping a physical switch and possibly require user authentication in order for the protection to be temporarily bypassed. Several connection types of the device to the computer systems are supported such as wired, wireless like Bluetooth or WI-FI, but not limited to those.

31 Claims, 13 Drawing Sheets

FIG 1(a-c)
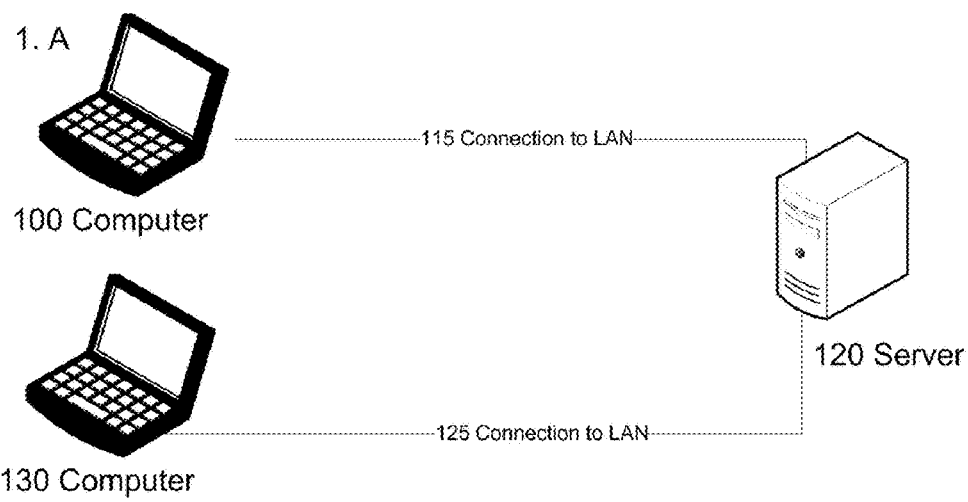
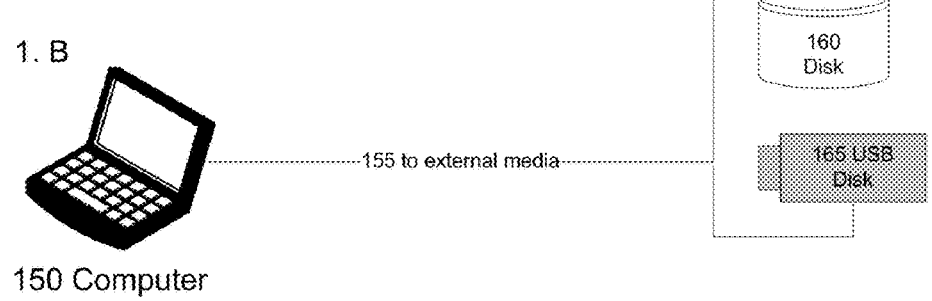
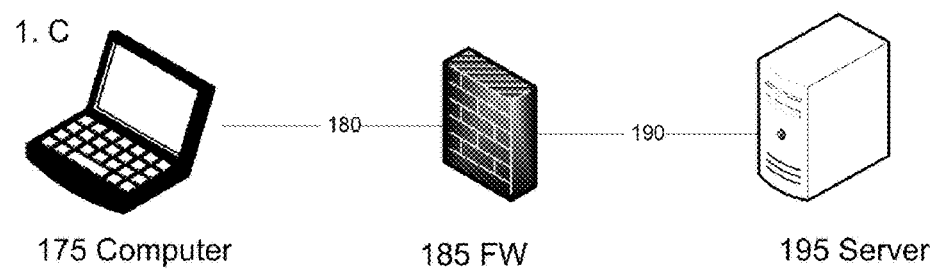

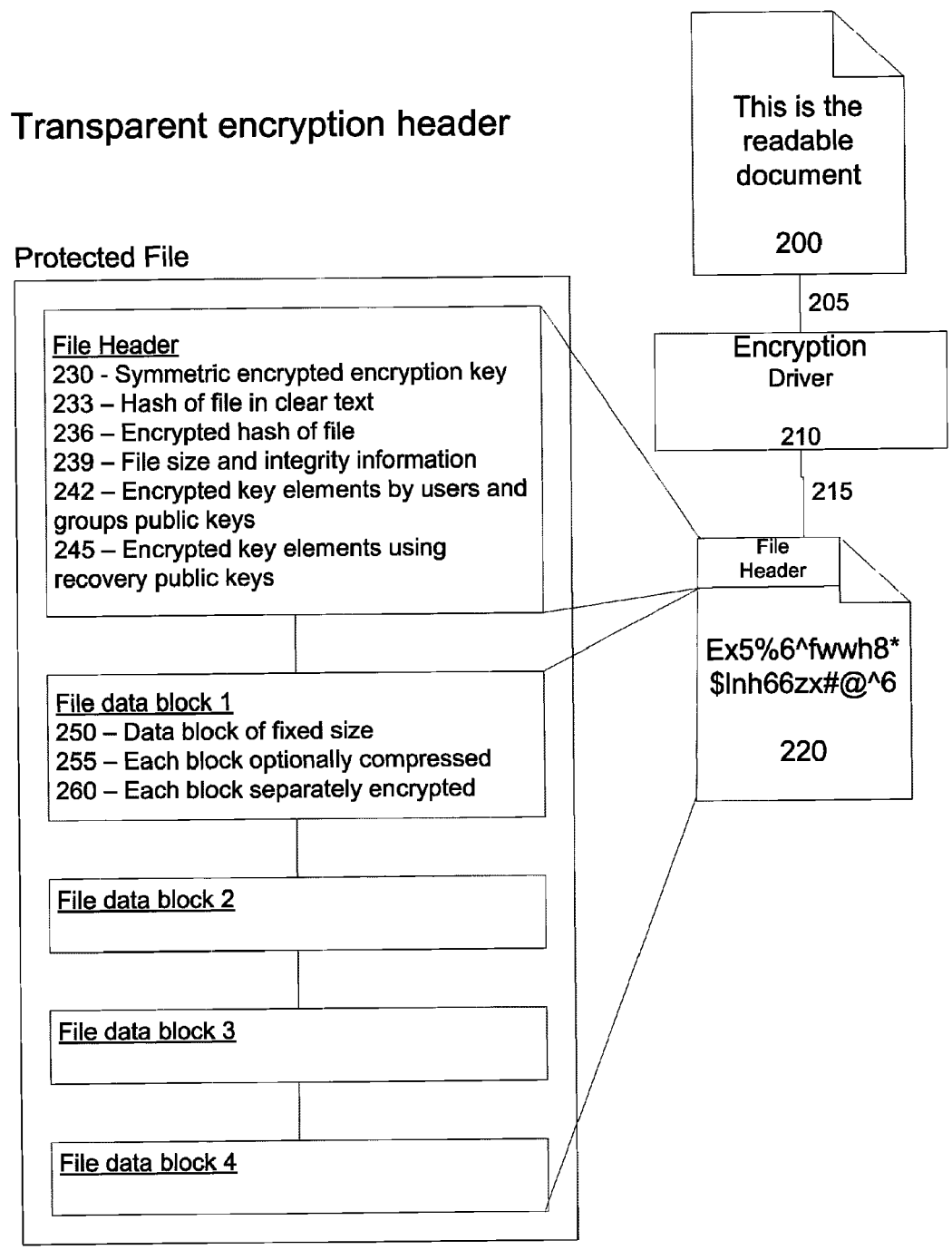

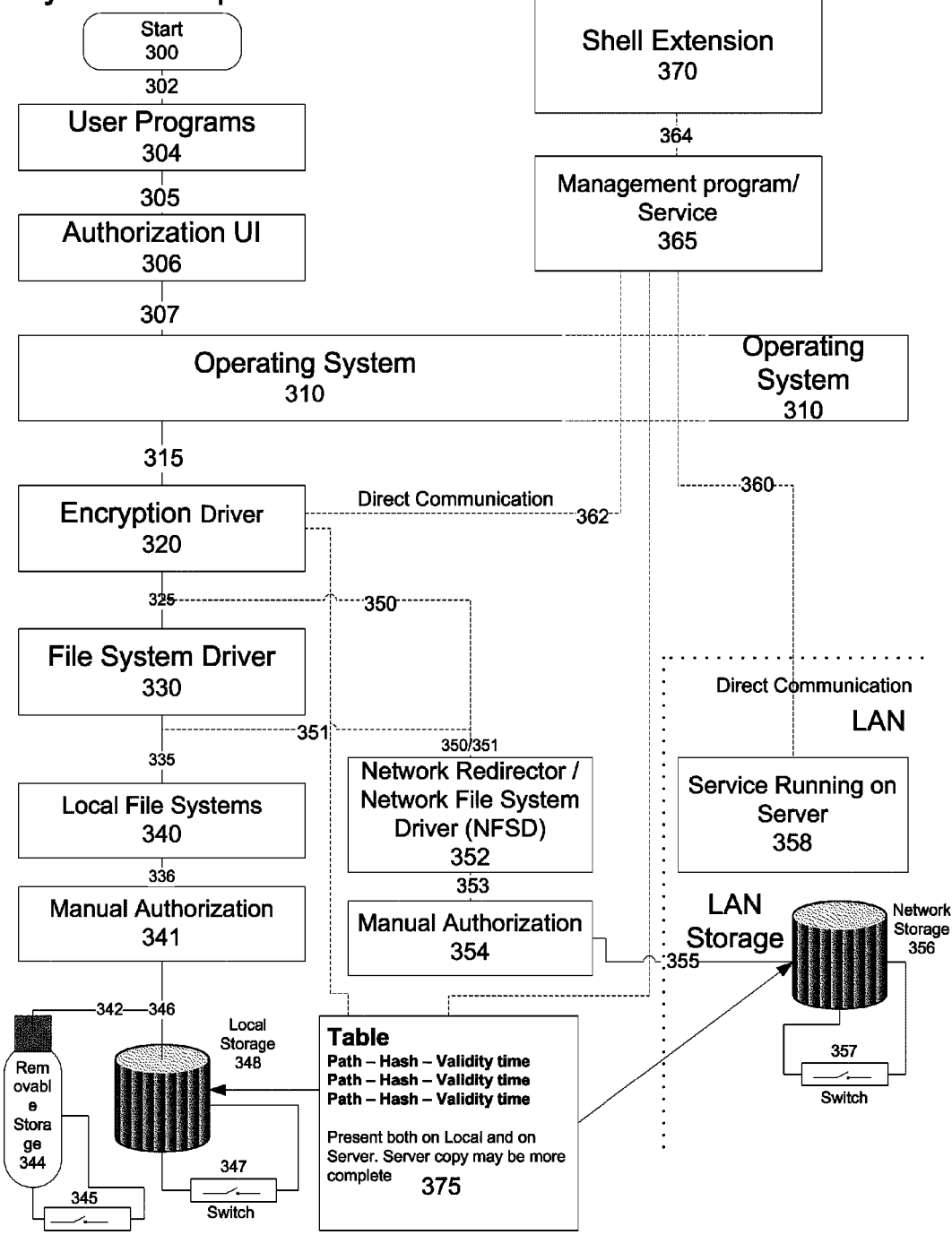

File and Metadata containers on backup storage

X11 (Object Data container)

| 450 |
|---|
| Data files stored by hashes as index |

| 455 |
|---|
| File 1 Version 1 (Complete file) |

| 460 |
|---|
| File 1 Version 2 (Diff, base = Version 1 + Data) |

| 465 |
|---|
| File 1 Version 3 (Complete file) |

| 470 |
|---|
| File 1 Version 4 (Diff, base = Version 2 + Data) |

| 475 |
|---|
| File x Version y (other files, complete/differential file data) |

FIG 5

Description of structures

500 Metadata container

| 505<br>File Identification | 510<br>Hash | 515 (Valid time)<br>Start Date Time | 520 (Valid time)<br>End Date Time |
|---|---|---|---|
| C:\Documents\Doc1 | Hash A | 05/04/07 10.00 | Still valid |
| C:\Documents\Doc2 | Hash B | 05/04/07 10.03 | 05/04/07 11.45 |
| C:\Documents\Doc3 | Hash B | 05/04/07 09.00 | 05/04/07 10.30 |
| C:\Documents\Doc3 | Hash C | 05/04/07 10.30 | Still valid |
| C:\Documents\Doc4 | Hash B | 05/04/07 11.00 | 05/04/07 11.15 |
| C:\Documents\Doc4 | Hash D | 05/04/07 11.15 | Still valid |

525 Object Data container

| 530<br>ID | 535<br>Type+base | 540<br>Header | 545<br>Data |
|---|---|---|---|
| Hash A | Full | Header A | Block A1 ...... Block An  (complete file) |
| Hash B | Full | Header B | Block B1 ...... Block Bn  (complete file) |
| Hash C | Diff + Hash B | Header C | List of blocks that differs from B (only blocks that differs) |
| Hash D | Diff + Hash C | Header D | List of blocks that differs from C (only blocks that differs) |

550 Details of Object Data container

| 555<br>ID | 560<br>Type+base | 565<br>Header | 570<br>Data |
|---|---|---|---|
| Hash A | Full | Header A | Block A01,A02,A03,A04,A05,A06,A07 |
| Hash B | Full | Header B | Block B01,B02,B03,B04,B05,B06,B07 |
| Hash C | Diff + Hash B | Header C | 01=C01,07=C07 |
| Hash D | Diff + Hash C | Header D | 02=D02,07=D07 |

590 Full contents of files

| 592<br>ID | 594<br>Full data |
|---|---|
| Hash A | Block A01,A02,A03,A04,A05,A06,A07 |
| Hash B | Block B01,B02,B03,B04,B05,B06,B07 |
| Hash C | Block C01,B02,B03,B04,B05,B06,C07 |
| Hash D | Block C01,D02,B03,B04,B05,B06,D07 |

FIG 6

Encrypted and Compressed files

610 Regular file (A)

| 612 Header | 614 Data (Blocks) | 616 EOF |
|---|---|---|

620 Regular file details (B)

| 622 Header | 624 Data Block 1 | 626 Block 2 | 628 Block 3 |
|---|---|---|---|
| 630 Block 3 | 632 Block 3 | 634 EOF | |

640 Encrypted regular file (C)

| 642 Header | 644 Enc Data Block 1 | 646 Enc. Block 2 | 648 Enc. Block 3 |
|---|---|---|---|
| 650 Enc. Block 4 | 652 Enc. Block 5 | 654 Padding | 656 EOF |

660 Encrypted file with Compressed data blocks (D)

| 662 Hdr | 664 Cmpr Blk 1 | 668 C.B.2 | 670 C.B.3 | 672 C.B.4 | 674 C.B.5 | 676 Padd. | 678 EOF |
|---|---|---|---|---|---|---|---|

FIG 7

Compressible and direct access encrypted data blocks

710 Encrypted Data blocks

| 712 Encr. Data Block 1 | 714 Padding |
|---|---|
| 716 Encr. Data Block 2 | 718 Padding |

720 Regularly compressed blocks in a encrypted file

| 722 Compressed Data Block 1 | 724 Compressed Data Block 2 |
|---|---|

| 726 Compr Block 3 | 728 Compressed Data Block 4 | 730 Padding |
|---|---|---|

740 Direct Accessible data blocks with Compression and Encryption

| Data Offset | 741 Header | |
|---|---|---|
| 0 — 16383 | 742 Compressed Data Block 1 | 744 Padding |
| 16384 — 32767 | 746 Compressed Data Block 2 | 748 Padding |
| 32768 — 49151 | 750 Compressed Data Block 3 | 752 Padding |
| 49152 — 65535 | 754 Compressed Data Block 4 | 756 Padding |

FIG 9
Autosync of files and serverless backup
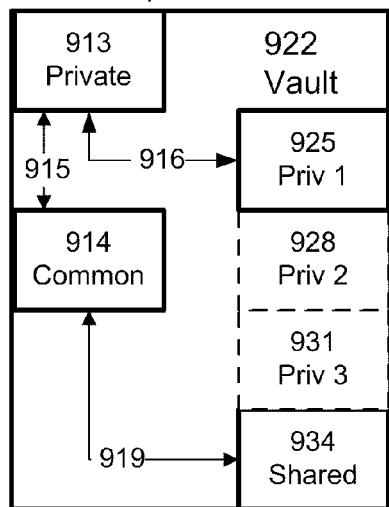
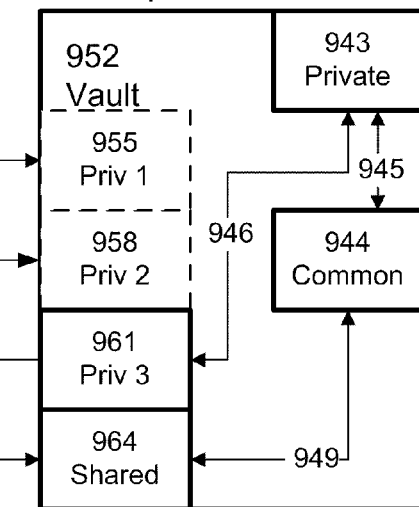
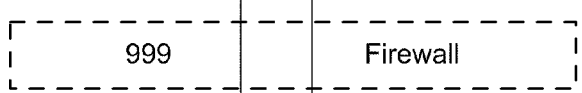
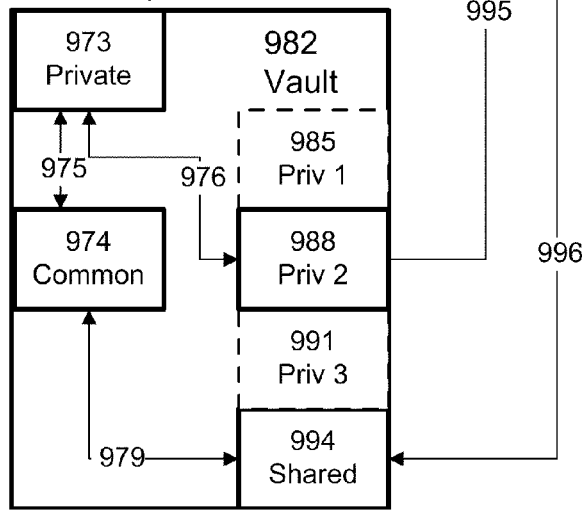

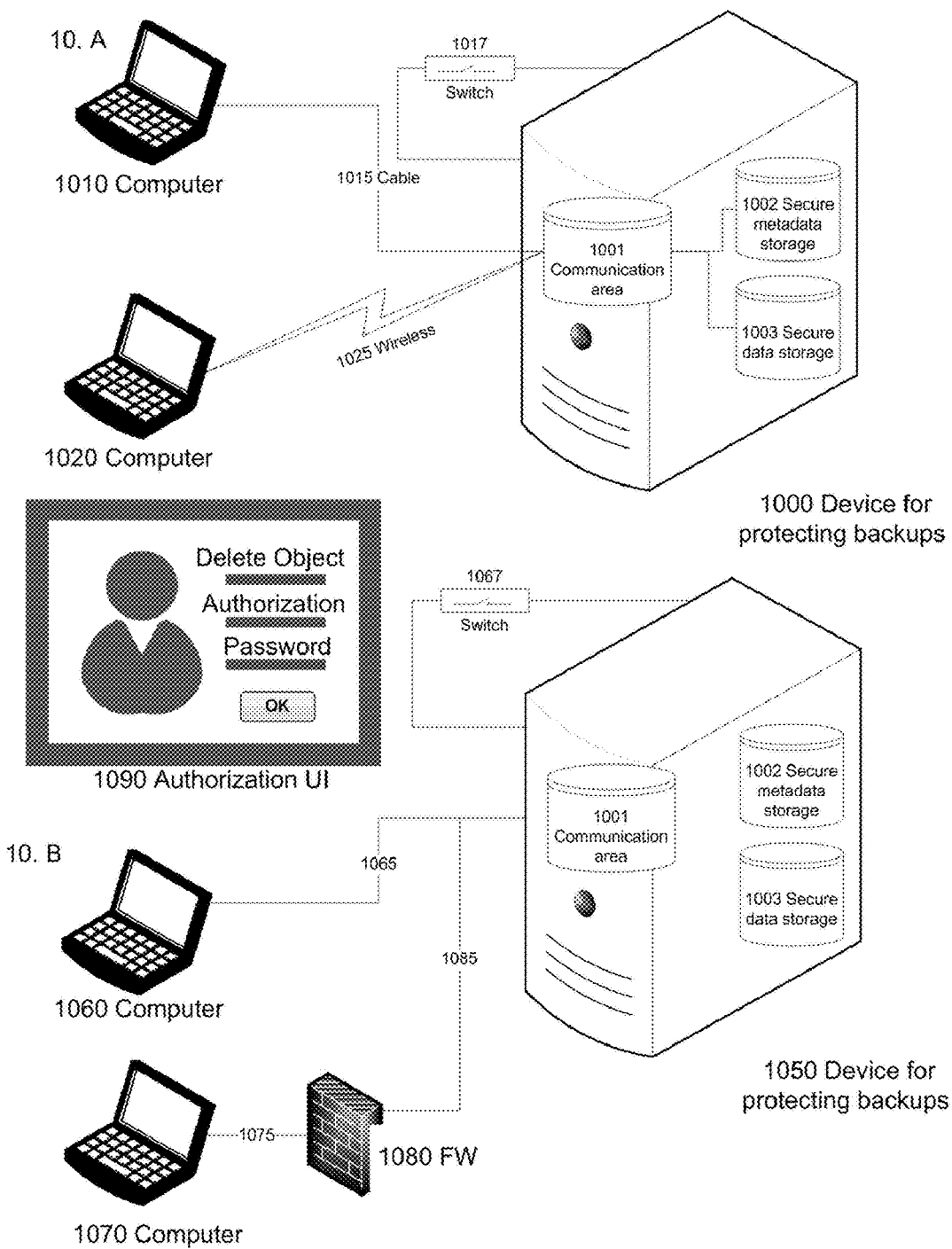
FIG 10(a-b)

FIG 11

Description of data files

1100 File with original hash = 0x12345678

| Hash ID | Items for hash calculation | Hash value |
|---|---|---|
| [HASHC] | 1101: "In one embodiment of two embodiments embodiment one is first" | 1102: 0x12345678 |
| [HASHD] | 1103: "In one embodiment of two"[y18,11]"s"[y30,13]"ne is first" | 1104: 0x13572468 |
| [HASHVER] | 1105: <Header with 0x12345678, 0x13572468> <item 1103> | 1106: 0x87654321 |
| [HASHNAME] | 1107: "12345678_87654321" | 1108: 0xABCD |

1150 File with binary hash = original file hash = 0x12345678 - not compressed

| Directory for storing file | D:\DATA\12\34 |
|---|---|
| Filename | 12345678.DAT |
| Header | -na- |
| Data | "In one embodiment of two embodiments embodiment one is first" |

1160 File with binary hash = 0x87654321 - compressed (original file hash = 0x12345678)

| Directory for storing file | D:\DATA\12\34 |
|---|---|
| Filename | 12345678_87654321_ABCD.DAT |
| Header | <Header with 0x12345678, 0x13572468> |
| Data | "In one embodiment of two"[y18,11]"s"[y30,13]"ne is first" |

FIG 12

Description of data files
1200 File with original hash 0x23234545

| Hash ID | Items for hash calculation | Hash value |
|---|---|---|
| [HASHC] | 1201: "In one version of two versions version one is first" | 1202: 0x23234545 |
| [HASHD] | 1203: "In one version of two"[y15,8]"s"[y24,10]"ne is first" | 1204: 0x45456767 |
| [HASHVER] | 1205: <Header with 0x23234545, 0x45456767> <item 1203> | 1206: 0x45645678 |
| [HASHNAME] | 1207: "23234545_45645678" | 1208: 0xEFAB |
| [HASHC] | 1209: "In one embodiment of two embodiments embodiment one is first" | 1210: 0x12345678 |
| [HASHD] | 1211: [z7][w10]"version"[z8][w22]"versions version"[z13] | 1212: 0x54542323 |
| [HASHVER] | 1213: <Header with 0x23234545, 0x54542323, 0x12345678> <item 1211> | 1214: 0x67656765 |
| [HASHNAME] | 1215: "23234545_67656765_12345678" | 1216: 0xABAB |
| [HASHD] | 1217: [z7][w10]"version"[z8][w22][y15,7]"s"[y9,7][z13] | 1218: 0x54541818 |
| [HASHVER] | 1219: <Header with 0x23234545, 0x54541818, 0x12345678> <item 1217> | 1220: 0x67651231 |
| [HASHNAME] | 1221: "23234545_67656765_12345678" | 1222: 0xABFA |

1250 File with binary hash = original file hash = 0x23234545 - not compressed

| Directory for storing file | D:\DATA\23\23 |
|---|---|
| Filename | 23234545.DAT |
| Header | -na- |
| Data | "In one version of two versions version one is first" |

1260 File with binary hash = 0x45645678 - compressed (original file hash = 0x23234545)

| Directory for storing file | D:\DATA\23\23 |
|---|---|
| Filename | 23234545_45645678_EFAB.DAT |
| Header | <Header with 0x23234545, 0x45456767> |
| Data | "In one version of two"[y15,8]"s"[y24,10]"ne is first" |

1270 File with binary hash = 0x67656765 - differential, not compressed
(original file hash = 0x23234545)

| Directory for storing file | D:\DATA\23\23 |
|---|---|
| Filename | 23234545_67656765_12345678_ABAB.DAT |
| Header | <Header with 0x23234545, 0x54542323> |
| Data | [z7][w10]"version"[z8][w22]"versions version"[z13] |

1280 File with binary hash = 0x67651231 - differential and compressed
(original file hash = 0x23234545)

| Directory for storing file | D:\DATA\23\23 |
|---|---|
| Filename | 23234545_67651231_12345678_ABFA.DAT |
| Header | <Header with 0x23234545, 0x45451818> |
| Data | [z7][w10]"version"[z8][w22][y15,7]"s"[y9,7][z13] |

FIG 13

Description of metadata files

1300 Metadata file with hash
0xABC34523

| Directory for storing file | D:\META\AB\CD |
|---|---|
| Filename | ABC34523.MET |
| Data | <1350> |

1310 Metadata file with hash
0x725A8DE0

| Directory for storing file | D:\META\7A\20 |
|---|---|
| Filename | 725A8DE0.MET |
| Data | <1360> |

1320 Metadata file with hash
0x19235678

| Directory for storing file | D:\META\EA\82 |
|---|---|
| Filename | 19235678.MET |
| Data | <1370> |

1350 Contents in file with
hash 0xABC34523

| Field | Content |
|---|---|
| 1351 Volume | {7A3AB7D0-DE4F-11D9-A3C9-806D6172696F} |
| 1352 Path | Documents and Settings\lebi\My documents |
| 1353 File | Invention.doc |
| 1354 Hash | 0x12345678 |
| 1355 Start | 04/06/06 13.00.15 |
| 1356 End | 05/06/06 11.25.33 |

1360 Contents in file with
hash 0x725A8DE0

| Field | Content |
|---|---|
| 1361 Volume | {7A3AB7D0-DE4F-11D9-A3C9-806D6172696F} |
| 1362 Path | Documents and Settings\lebi\My documents |
| 1363 File | Invention.doc |
| 1364 Hash | 0x23234545 |
| 1365 Start | 05/06/06 11.25.33 |
| 1366 End | -na- |

1370 Contents in file with
hash 0x19235678

| Field | Content |
|---|---|
| 1371 Volume | {7A3AB7D0-DE4F-11D9-A3C9-806D6172696F} |
| 1372 Path | Documents and Settings\lebi\My documents |
| 1373 File | Invention.doc |
| 1374 Hash | -na- |
| 1375 Start | 05/06/06 11.25.33 |
| 1376 End | 05/06/06 17.25.12 |

INTELLIGENT STORAGE DEVICE FOR BACKUP SYSTEM

RELATED APPLICATIONS

This patent application claims the benefit under 35 U.S.C. §119(e) of U.S. Provisional Application No. 60/811,233, filed Jun. 5, 2006. Pursuant to 37 C.F.R. §1.78, Applicants note that the above-identified patent application may be related to U.S. patent application Ser. No. 11/807,726, filed on May 30, 2007.

COPYRIGHT NOTICE/PERMISSION

A portion of the disclosure of this patent document may contain material, which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data as described below, inclusive of the drawing figures where applicable: Copyright(c) 2006, 2007 by Leif O. Billström and Kurt U. Lennartsson.

FIELD OF THE INVENTION

Embodiments of this invention relate to data security of a storage device, software or hardware or a combination, used for purposes of backing up data in computer systems.

1. Background of the Invention

A method and apparatus, a storage device for providing protection of files and objects in backups, eliminating redundant copies and with a snapshot capability making it possible to restore any object, whether encrypted or not, to the exact revision of the object to a certain date and time is described. The storage device offers high protection against, at least by mistake incorrect use allowing even encrypted data to be securely stored without redundancy The current invention offers protection of data and data backups of computer systems, by using a hashing technique to create a secure backup system that, besides eliminating redundant storage of data, allows data to be securely managed because of a requirement that data only can be added, never removed or modified on the device. The invention uses the hashing technique in combination with adding a new file header to compressed and/or protected files. Furthermore, the invention allows for restoring data to a specific date and time and revisions of objects without having to store full images of each version. The system uses different technologies for the protection of objects to make the solution fast, reliable and flexible. Technologies include but are not limited to symmetric and asymmetric encryption techniques. Furthermore, the hashing technique offers self-verification of data integrity before storing or restoring any information, even though data may be encrypted.

To fully understand the requirements of the device, a solution with options for securing information using encryption integrated with this backup device is described. The invention presented in this application is also so easy to use regarding backups, restores, transportation, synchronization and encryption such that most users will be able to use it intuitively without any previous training or reading the manual but still very powerful in its protection of stored data.

The novelty in the presented invention is that it allows a multitude of techniques to be used, forming a secure system; security by using encryption of the data combined with redundancy elimination, where the elimination even works for backed up data when it is encrypted using identical or different keys. With data snapshots in time and also recovery possibilities and user rights to access files which may be controlled by common public key cryptography techniques; the application describes an integrated system where the parts are working together, forming a single, simple, unique and very easy to use powerful and secure backup system.

2. Description of Related Art

It is advantageous to provide a system that back ups user data transparently whether on a single system or a networked shared system. It would be even more advantageous if the same system also offered easy access for authorized user(s) while eliminating access for all others, in such a way that it avoids backing up redundant data i.e. not storing multiple copies of same information.

Many users neglect to take regular backups of their computer systems for many reasons. In some cases because they do not understand the risk of loosing information, sometimes they believe that backups are too difficult to handle, is too expensive, or they just think it is a too complex and time consuming procedure to take backups. Instead they make copies of important information in other places on the hard disk, not realizing the fact that in case of a hard disk crash, everything may be lost.

There is always a risk of loosing information. Taking backups on CD or DVD media feels quite scary since they are very fragile and sensitive to physical damage. Another problem is aging of CD and DVD media. No one really knows how long they will last before the information is lost since their lifetime is very dependant on the storage environment. When they get old it may be impossible to recover their contents.

Tape backups are more reliable, but tape recorders are expensive, the tape media is expensive and tapes must be handled with care. Another problem is that there are many tape station producers and also many producers of media, and when tape stations are replaced by new versions there is no guarantee that the new station will be able to read previously written tapes since it is possible that the new recorder does not support the old tapes and the format used or the tape head alignment was incorrect on the old drive (a common problem). Backups taken on tape must be verified separately to verify that their contents are valid.

Backups on removable storage devices seem to be a good alternative. Hard disk devices have long life and are very reliable. The formats on the disks are likely to be supported for long time and it is easy to copy from one disk to another to make duplicates of backup copies. The problem with disk backup solutions in general is that it is very easy to, by mistake, remove or destroy the backed up information. Disks have no selective protection permitting the user to store new data like files, but not remove or change already existing files.

Seen from the view of security of backups, they should not be encrypted. Backups are for restoring data and should therefore be as isolated as possible from other interfering processing, which in case of a restoring process may cause data to be damaged. In another view, sensitive information stored on backups must be protected, since this desire for clean solutions also makes backups sensitive in the way that loosing control of backups may cause severe information leaks. Combining these views, the data should always be encrypted, wherever stored. The data should also not be changed, or at least changed as little as necessary, for the backup process. In the design of the encryption and backup, care must be taken such that the risk of loosing data is minimal. There must be robustness in the design and handling of encryption and encryption keys.

It is advantageous to provide a backup system that is very easy to use and still very secure in its protection of data. It must be designed in such a way that any computer user with enough knowledge to use elementary functions of the operating system and some basic applications can use this device for backup purpose, but still the device should protect the backups so that incorrect operation of attached computers, viruses or other malicious or malfunctioning software cannot damage previous backups that has been stored on the device. Outmost precaution must be taken such that destructive behavior by the device is impossible, without first being approved by the user that backed up the data, that it is to be removed.

In its ease of use, the device should only need to be connected to the computer and to a power source. The normal backup function should start automatically and immediately without any user intervention. Preferably, the connection to the computer should use a wireless connection like Bluetooth or WiFi, but are not limited to those and can therefore be any other existing or not yet implemented wired or wireless method.

Prior art, such as general data backup programs integrated with general data encryption solutions are not working very intelligently when used together. When looking at data backups only, they typically generate lots of duplicate data coming from single local data sources and even worse when looking at backup systems in networked environments, where lots of data must exist on many local systems but not necessarily needs to be backed up in multiple copies. Without encryption, backup systems often offers compression, and sometimes they also offer elimination of redundant data in backups, but with encryption where the same data can be encrypted using different keys, the problem is that current backup systems can neither compress encrypted data nor identify redundant information so the same information is backed up over and over again.

The problem stems from the nature of separation of encryption function of the files on the local and/or networked computer systems and the backup functionality. By integrating the two in a novel way, a new category of systems is provided that not only protects the data on the systems when used, but also efficiently stores protected files without redundancy and that makes recovery integrated with the protection process.

To fully understand the problems with current solutions, the problems with encryption solutions and then the problems that arise when adding encryption to backups must be identified. There are two major encryption techniques frequently used on local computer systems, full disk encryption and file-by-file encryption, each with its own set of drawbacks.

The drawback with full disk encryption (encrypting/decrypting the data stream read or written to sectors on the local storage) is that once the operating system is up and running, data access is transparent to applications accessing the encrypted disk since the data is transparently decrypted as it is read from the disk and transparently encrypted before being written back to the disk. This means that whenever a backup is taken, the information has to be re-encrypted at the point at backup, since from the backup program's point of view none of the information appears encrypted. The backup encryption keys must be managed separately from the disk encryption keys. Full disk encryption thus provides transparent access for the authorized user, but offers no protection of information when copying files to servers for storage or sharing or when backing up data.

Looking at file-by-file encryption, the files are encrypted in the first place, so re-encryption is not necessary as long as the backup system can backup the files without decrypting them and in those cases where the keys are managed in a way that is suitable for backup. File encryption using symmetric encryption with symmetric keys and its key management integrated with the installed operating system do not create a foundation for robust solutions for making backups, and is thus not flexible enough for a smooth backup integration with encryption. File encryption does also not necessarily perform well in networked systems.

Using any of the described encryption methods prior to the current invention, there are also common problems, such as sharing and encrypting files in networks, where sometimes multiple users need to access the same files simultaneously. Regardless of encryption, there is always the problem of efficiently backing up files where the same files frequently are stored in several places thus consuming space both on local and network storage as well as on the long time backup media. Backups are many times also difficult to fully restore to a specific date and time.

There are also other ways of encrypting files using separate programs for the encryption process. In such implementations, the method is not seamless to the user and there is an added manual handling of encryption keys. Data protected this way, would always be encrypted both on (server) shares and in backups, but won't permit simultaneous access for other users to copies on (server) shares. Such solutions cannot automatically eliminate redundant copies.

Independent of encryption method, the redundant copy elimination has not been possible in prior implementations when files have been encrypted on different computers and/or in combinations by different keys.

The current invention describes a separate hardware and/or software device adding functionality to the application field addressed by the above described areas. It also allows for sharing, synchronization and mirroring of data by several users and computers.

KNOWN TECHNOLOGIES: In this description, 'encryption' and 'decryption' are used frequently. Normal encryption and decryption methods may be used to implement this functionality, but encryption and decryption also denotes other means of transforming data from one form to another using an algorithm or formula for the transformation. Some algorithms use a 'key' that in those cases is just an identifier or parameter used in the transformation. The key denotes this identifier and encryption and decryption just denotes the direction of the transformation.

As described above, some transformation of data uses a key. This key is used, when the transformation is named symmetric encryption, to control the transformation both for encryption and decryption. When the transformation is named asymmetric encryption, the encryption transformation uses one key and the decryption transformation uses another key and where these keys must be used in pair to provide the means for the decryption to return the data into its original state.

'Metadata' is also used frequently to denote additional information, derived from within the file, from the operating system or added by the user. This data is used to identify the target data (backup, identified by a hash) and may contain thumbnails, descriptions, locations where data has been stored, names of users data has been used by, date and time when data appeared and vanished (was created with this hash and deleted or modified). The metadata may contain other information as well that may be of use for searching, restoring and identifying purposes. Within the metadata there may also reside information of the expiration for the targeted data, and other archival parameters, although this is not required for this current invention.

'Shell extension' is also used and denotes some type of extended functionality to the operating system of the computer, enabling easy to use and operating system-like abilities to access and control the different components and functions of this invention. The shell extension may be implemented in different ways for different operating systems, and may in some environments be implemented as separate programs and in other environments be components adding seamless functionality to the installed operating system.

CITED REFERENCES: Many patents are targeting antivirus issues and fast authorization of program access using hashing techniques as a way to identify known files and objects. In some patents the hashes are used for identification only, while in other patents the hashes are used as a way of reducing bandwidth before transportation to the central server for scanning. The current invention uses a combination of several known base techniques (prior art) to create a unique and nonobvious solution, creating a new integrated, easy to use, security and backup system for computers, where each part of the solution is integral to the functioning of the current invention, significantly improving the way disparate solutions have addressed the problem in prior art. No references have been found to systems trying to solve the complete problem area addressed by the current invention. However, there are references found to prior art covering some aspects of the problem where a component of the invention may in some cases be similar to components in prior art, but it is the way components are working together as a system that makes the invention unique. The descriptions of prior art listed below are aimed at describing the significant differences found between the current invention and each component of referenced prior art.

A hash function has long time been a well-known technique for creating a small digital fingerprint from any size of data. It can be accomplished by using popular hashing methods such as MD5, SHA1 and other perhaps more or less-known hash calculations, encryptions, compressions or other numerical methods to create a binary identifier to represent the object. This object can be (but are not limited to) a string of data in transit, a data string in memory, in a database, a block in memory or on a storage media or a file. The methods for calculating hashes are many, and they can be combined in different ways. The quality of a hash computation can be good or bad. The described invention requires a good hash calculation with few hash collisions; i.e. having a very high probability that two generated hashes never will be the same for two different objects.

Since the described invention also provides integrity protection in the form of encryption, another requirement of the hash is that it should be impossible to reverse the hash or hashing algorithm partly or fully to retrieve parts of the original object.

Constructing a binary tree is also a well-known technique like using it to construct an ISAM database, which stands for Index Sequential Access Method. The binary tree is used in the indexing part enabling fast searches using one or several indexed keys linked to the data records, each sorted and stored in a binary tree. The sequential part is accomplished by traversing the tree forward or backward to retrieve the next or previous ordered key and thus the data record. In the described invention the b-tree technique is used together with the hashing technique to store information efficiently in ways that has been used in such databases since more than 20 years, so this method is considered prior art.

Many patents discuss using hashes for identifying files by the hash only. This is also well known technology. Patents and articles that have been found in the same technology area covers only partial components of the current invention. In the sections below differences are described explaining why the current invention don't interfere with sited patents and patent applications.

In U.S. Pat. No. 6,983,365, filed on Jan. 3, 2006, a method for Identifying and coalescing identical objects encrypted with different keys is presented. This application is targeting detection of identical, objects encrypted with different keys. It describes a method to encrypt each object with its own representation, i.e. a HASH of the object. This hash is then encrypted with different keys, creating key items that are stored in cipher objects, and because the representation is used as encryption key it must be discarded for security reasons. When a clear text object is to be tested for identicalness it must first be encrypted using its own representation and then, as encrypted, be compared with the object to be tested with since the representation from the earlier encryption is discarded. In those cases where one of the keys used for the first object is available, the representation of the first object can be recreated by decrypting the corresponding key item. Actually in this patent, the data objects are encrypted with the same key as long as the objects are identical. The different keys the patent refers to are the keys that are used to encrypt that single encryption key. In the current invention, encryption of identical objects with different keys is permitted, and creates a significantly improved functionality over what is described in this patent to verify identicalness of the original objects. The improvement using the current invention's described implementation is that it uses one representation, a hash for identification of the identicalness of the clear text objects, but the current invention uses a different encryption key for the object encryption. The calculation of encryption keys must for security reasons be different than the calculation of identification hashes in order to be secure. It may still be a binary representation of the first object, or it may be a randomly binary value, generated for each instance of its use. With the current invention's solution, only comparing relatively small hashes can prove identicalness while the whole object has to be compared with the previous patent solution. The current invention also permits modifications in files without decryption and encryption of the whole files, as the referred patent requires. The same inventors have filed a series of applications covering variations of the same ideas.

In U.S. Pat. Application No. 20050108240, On-disk file format for a serverless distributed file system, ideas are presented where files are divided into multiple blocks, each encrypted as described in U.S. Pat. No. 6,983,365 (some of the inventors are the same). In this application hashes for verification of the blocks in a way more similar to the current invention is used, but the hash stored is covering the encrypted block and not the data before encryption like the current invention use for identification of identical blocks. In the referred application, in order to identify identical clear text blocks, the block to test must first be hashed, then encrypted and finally hashed once again before the hashes and identicalness can be verified, which significantly slows down the verification compared to the current invention's method of verification.

In U.S. Pat. Application No. 20050076066, Method, system, and program for retaining versions of files, a method for maintaining versions of files is presented as the system issues a creation of a versioned file name and copies the file to a file with this new name. In the current invention hashes are used as identifiers of the contents of all files. By hashing the file to be versioned, the current invention can immediately find if there already exists a copy of that file and omit the file copy process if not necessary. In the current invention, the versioned file's name is set to the hash of the file itself. The current invention's method is significantly improved over what is described in the referred patent and patent application.

In U.S. Pat. Application No. 20050027757, System and method for managing versions, an object oriented file management database is described, managing versions of objects and documents in a database, mainly focusing on version management. This functionality is, as it appears, covering a small part of the current invention, but the current invention works directly on the file system and does not use a database for storing the objects. In the current invention the user interface is 'invisible' since it is implemented as an integrated part of the operating system such as a shell extension (in case of Microsoft Windows) and is therefore intuitive to use. The current invention also works with snapshots in time, where it may show the contents of volumes and folders at specific moments in time. Regardless of whether the files in the current invention exist locally or on another media, they are found by using hashes as identifiers. As mentioned above the current invention includes much more than only versioning of files since that is only a part of a component in the current invention.

In U.S. Pat. Application No. 20040168058, History preservation in a computer storage system, an invention regarding long-term storage is presented, and that small part is closer to the current invention than most of the other patents addressing this area are. Significant differences exists since the current invention also targets compression and encryption and still enables the use of hashes to remove duplicates even for those objects that are encrypted using different encryption keys. Another significant differentiation from the current invention is that all of the referred patent's independent claims, refers to that expiration times are assigned to the historical records according to a shared set of rules, while the current invention requires no such rules in its design.

In U.S. Pat. Application No. 20040148306, Hash file system and method for use in a commonality factoring system, a solution for a hashed computer file system is presented based on hashes as identifiers, identifying the files/objects. In one way this technique is similar to the current invention's, but the current invention use the indexing method applied to the existing file system, with a structure similar to ISAM files where the objects are addressed using hashes as keys. As mentioned earlier, these techniques have been commonly known for several decades. Other applications by the same inventors exist, describing similar variants of their invention.

In U.S. Pat. Application No. 20030028761, Cryptographically signed file system, an invention that only covers a small part of the current invention is presented, dedicated to DVR systems and used for validating data before use. The current invention uses hashes to identify and find the data—not primarily to verify the data, but similar verification as the referred application describes is possible to use with the current invention as well.

U.S. Pat. Application No. 20030021417, Hidden link dynamic key manager for use in computer systems with database structure for storage of encrypted data and method for storage and retrieval of encrypted data, describes an invention involving both a local and a remote cryptographic engine. In the current invention only a local cryptographic engine is needed and used meaning that the files are never required to be decrypted on other storage locations than the users computer, thus raising the security level.

In U.S. Pat. Application No. 20020038296, Data repository and method for promoting network storage of data, an invention which in some parts are similar to the current invention is presented, in which the independent claims; 1. Requires more than one client to be connected to the network and store the data in repositories connected to the network. 2. Determining the number of users access authorization credentials for the data items. 3. Using hashes to reduce redundant transfer over slow connections. 4. Using a proxy in combination with hashes and a local repository to cache internet access. In the current invention there are no restrictions requiring the clients to be connected to a network, and no counting of users. There is no special handling of slow connections and finally the current invention does not attempt to cache internet access.

In U.S. Pat. Application No. 20050132382, System and method for updating files utilizing delta compression patching, the invention is dedicated for creating patches and updating installed software. The current invention may in a way update installed software during the restore process, but is in no way limited to that specific behavior or only software/application files.

In U.S. Pat. Application No. 20050131961, Data repository and method for promoting network storage of data, Patent covering creating file name identifiers of fixed size (as hashes). It also describes how to connect file contents to those identifiers. This described method of building file pathnames as hashes including previously calculated hashes up to that node may be used in current invention's creation of metadata names, but are not required or indicated to be used. The referred patent also refers to connecting hashes to specific file contents, which is what the current invention uses in the data repository. However, in the current invention the data itself contains a header with hashes, and in the repository there is also information of differences between files, a significant difference that is needed in order to carry out the current invention, which is not addressed in the referred patent.

In U.S. Pat. Application No. 20050131939, Method and apparatus for data redundancy elimination at the block level, a method and apparatus for data redundancy elimination at the block level is presented to reduce redundancy of blocks in files and data objects by storing duplicate hashes (or super hashes) instead of duplicates of the referred blocks. In the current invention the redundancy elimination works between versions of files using hashes instead of, as in this referenced patent, internally within files and objects. Although, this method may be used for duplicate elimination during file transport in the current invention, but that is not required and the current invention does not address the transport issue in this way.

In European Pat. Application No. US2004236761, File system storage, is describing an implementation of a hierarchical file system of the B-tree structure like used in many ISAM database implementations where the key used is a hash value of the objects name. In the current invention the hash of the object itself instead of the objects name is used to prohibit duplicated storage of objects and files. Which is a significant improvement over the referred patent.

In European Pat. No. US2005226059, Clustered hierarchical file services, an invention that relates to a system and method for a virtual cluster file server, which is far from what the current invention covers.

As can be seen in the references to prior art above, there are many previous applications targeting some aspects of a complete solution for backups, but none are close in covering a fully integrated system as will be described. The current invention targets the aspects of making a secure reliable backup device, while the referred applications covers different details that may or may be used in an application using this device: The device itself may us some of the techniques, but are in no way limited to this behavior. Security by using encryption in combination with redundant copy elimination and a very ease of use design makes it possible to architect the system that requires no user invention. The current application describes a system using this device and the requirements of this device.

BRIEF SUMMARY OF THE INVENTION

A method and apparatus for securing files on a computer system and backing up only needed files, avoiding redundancy. The method includes ways of giving an authenticated user transparent access to protected data and using the same credentials for performing a secure backup of files. Files can be restored to previous revisions or to a certain date and time. The implementation also permits backing up files on computer systems and networks where encryption is used, even then, duplicate copies of same information may be avoided even when the encryption keys used are different and files are encrypted on different computers. The implementation protects data from accidentally being lost by malfunction in the network, on computers, installed software and even against incorrect handling by the user of the systems.

The current invention offers the design of the device to be implemented as a separate hardware device, a combination of hardware and software or implemented as a software device running on an ordinary computer, like a dedicated backup computer, standalone or in a network for this purpose.

Backup programs using the invention do not necessarily have to be designed to use encryption or the suggested header design, but if they do, they may take advantage of the redundancy elimination even for encrypted files, and even when encrypted using different keys. The invention allows backed up data to be controlled over time, and allowing instances of data to be restored to the exact revision of a specified date and time.

The hash calculation of file contents also makes it easy to create programs and functions added to the operating system that offers fast search and detection of duplicate files on storage media. By adding a component, a file change detector, that monitors changes in the file system continuously recalculating hashes when needed and sorting the hashes in tables connected to the full name and location as seen by the operating system and user, searches for identical files are instantaneous. And backups are also handled more quickly. The tables are very useful in the described backup functionality.

BRIEF DESCRIPTION OF THE DRAWINGS

The current invention is illustrated by way of example, and not by way of limitation, in the figures of the accompanying drawings and in which like reference numerals refer to similar elements and in which:

FIG. 1 is a block diagram of one embodiment of a computer system in which the current invention may be used.

FIG. 2: Shows how a file is internally blocked into different sections and also contains a new header.

FIG. 3: This drawing shows one embodiment of how the encryption driver is implemented at the system level and the path of IO requests.

FIG. 5: Shows a more detailed sample view of the metadata structure for backups.

FIG. 6: Shows a detailed sample view of how the encryption is implemented.

FIG. 7: Shows a detailed sample view of how the compression is implemented.

FIG. 9: This drawing describes a similar situation as FIG. 8, but one computer is now isolated by a firewall. The computers and backups are in this case also protected by encryption.

FIG. 10: Is a block diagram showing computers connected to the devices for protecting backups.

FIG. 11: Shows one embodiment of how a data file is stored compressed and not compressed on the device for protecting backups.

FIG. 12: Shows how another data file is stored compressed and not compressed, differential and non-differential on the device for protecting backups.

FIG. 13: Shows one embodiment of how metadata information is stored for a file in two versions.

DETAILED DESCRIPTION

Figure 4:
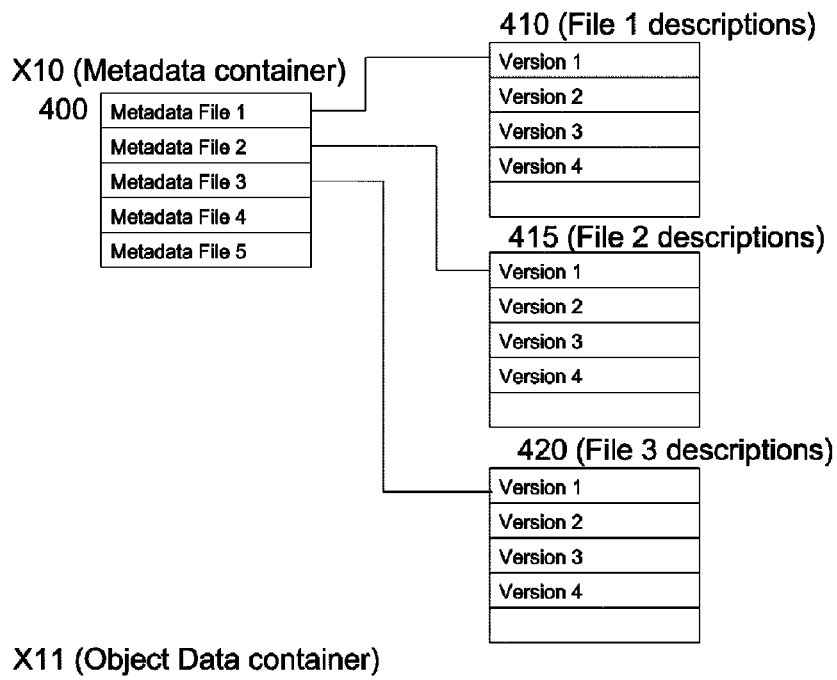
FIG. 4: Shows a sample of the file and metadata structure at the backup server.

The current invention is described by way of example, and not by way of limitation.

FIG. 1: Shows typical embodiments where the current invention may be used; FIG. 1A. Computers (100, 130) are connected within a LAN (115, 125) to a common server (120) using synchronization of files and backups. Files stored on the network server may be simultaneously shared among the computers (100, 130) where the encryption/decryption takes place locally on the devices and all information sent over the network (115, 125), through the network interface and stored on the server (120) always are encrypted. FIG. 1B. Computer (150) connected to different types of external storage media (160, 165) where files may be automatically backed up or synchronized to those media. FIG. 1C. Computer (175) connected through a firewall (185) to a server (195) backing up files encrypted on the server utilizing direct communication between client and server applications to offer very high security levels.

EMBODIMENT FILE ENCRYPTION: Files are encrypted together with a leading header. The header contains relevant key information used for backup purposes, sharing of information over the network and for permitting files to be sent by for example email or other distribution methods to other users (using separate transport keys whenever the installed public keys are not sufficient).

The encryption of files for backup purpose does not require a driver, but the design of the header and also the internal structure of encrypted files are dependant on whether the backup is implemented together with a file encryption driver or if the backup or encryption are implemented as separate, standalone components. Since this invention targets a complete solution with encryption, sharing of files in networked environment and backups, all aspects combined to get an optimal solution are considered.

FIG. 2: Shows how a file contains a special header and internally is blocked into the different sections or blocks. The file (200) is seen by the application programs and the user as a normal file without any encryption or special header, as this is accomplished by the encryption driver. A file request is sent through the operating system (205) to the encryption driver (210), which performs the actual encryption, and sends/receives encrypted information direct to the file through the operating system (215) accessing the encrypted file (220). This figure is also outlining some of the information in the new file header structure with its different components of for the invention important information (230-245), and the data, which is divided in logical data blocks, each separately optionally compressed and encrypted (250-260).

The described header contains hashes of the encrypted and clear text file content and also a hash of major parts of the header components. There is also information needed to manage the symmetric keys in a fast way. Some of the content in the encrypted header can be seen;

- User file name (since the file may be stored under an encrypted filename). This name may be required in some implementations, but may be of no interest in others. When implemented, the encryption driver uses it transparently instead of the normally used name in the file system for accessing files. The encryption of the file system name is put in place for two reasons; 1. Different users and groups may store different files under the same logical name on same locations. 2. By encrypting this name, reading the directory without the encryption driver gives no clue to the files real name, which might indicate their contents. This file name in the header may itself be encrypted for protecting the files even more.
- Hash of the unencrypted data (233). This hash is vital for the redundant copy elimination in the backup part of the invention. It must be calculated automatically by the driver as files are modified.
- Hash of the encrypted data (236). This hash is also used in the redundant copy elimination in the backup part of the invention. It is used in the implementation of differential backups. The driver must also calculate this hash automatically as files are modified.
- Encrypted symmetric key (230), by local computer/user symmetric key. Since each file may be encrypted by a unique key, (even though it is not necessary for the functionality to have different keys) this file encryption key must be encrypted with all other keys possible to use for decrypting this file. Considering speed of implementation, each computer uses a single symmetric key for encrypting the key of its or the current users files. This element is controlled by that computer or user key.
- Encrypted symmetric keys (242), by key elements constructed using the public key encryption for other authorized entities such as users and groups.
- Possible encrypted transport keys (245). These are also items constructed by encrypting the same file key, but with separate transport keys.
- Recovery key(s). This is also constructed by encrypting the same file key, but with a separate recovery key(s).
- Key verification information used to verify the integrity of the encryption key.

This header design, used in combination with the file encryption, permits very secure implementations of file encryption with a security level in close class to full hard disk encryption, but still implemented in such a way that many of the problems with hard disk encryption are avoided. One important problem that is avoided is the need for loading drivers early in the logon phase, which often requires special drivers to be developed and implemented in conjunction with the encryption product. Attaching smart card readers and other devices for identification of the user in the pre-boot authentication are examples of such problematic areas.

One way to create such a secure implementation, but not the only way, is to encrypt all files on all disks. Different keys may be used for retrieval such as automatic boot keys used during the early boot process. Keys controlled and created by the installed operating system are used later during the booting process. Finally user private keys may be used directly after successful identification of the user.

The hashes in the encrypted files headers are used for digital verification of the modules loaded at start from the earliest boot stage. Files loaded must have a correct hash before allowed to be used. Internal verification of the different steps involves using hashes to assure the security.

In this implementation, new drivers and files are only allowed to be installed when the operating system is running and all keys are in place. A separate boot recovery device or function may exist in case the operating system is damaged and needs to be repaired because it no longer can be loaded normally. Normal system restore and installation of programs are working well since those involve only files which were available when the system was running and as such, they are already encrypted and hashed.

FIG. 3: Shows how the driver containing the encryption routine (320) is implemented and the path of IO requests. When the user program (304) reads information from the disk, an IO request is sent through the operating system (310) to the encryption driver (320). This driver uses the appropriate file system driver (330) for accessing data locally on a storage media (through 340) such as a USB token (344), any other removable media or a local disk (348). A physical switch (345) attached to the removable media (344) controls the ability to change or delete stored objects on the removable media. Similarly a physical switch (347) attached to a local disk (348) controls the ability to change or delete stored objects on the local disk. The access can also target files stored on a server (356) using a Network Redirector or Network File System Driver (352). In one embodiment, a manual authorization module (341) for Local File Systems and (354) for network storage controls the ability to change or delete objects via an authorization user interface (306). In one embodiment, a physical switch (357) attached to the network storage (356) controls the ability to change or delete stored objects on the network storage. In another embodiment, the authorization through the authorization user interface (306) can work separately from the respective physical switches (345, 347 and 357) so that either and/or both can be used to authorize change or delete of stored objects. Depending on the installed operating system the storage path may take different ways (350, 351), but is always controlled by the encryption driver. Table (375) contains version specific information and hashes, making it possible to quickly find a specific version, and it also makes it possible for the management program/service component (365) to keep track of multiple references to identical files or, files encrypted with different keys, with the same file contents.

The user interface can be an extension to the system shell (370) or a separate management program/service (365) or a combination of both. The interface uses direct communication via the operating system (310) with the encryption driver as shown by (362) thus enabling direct control and access with the tables (375) as well as with the file content in encrypted form. When appropriate, communication may also exist with a running service (358) on the storage server. This direct communication is needed, in one embodiment, for the integration of the backup process together with the encryption.

The implementation also provides for integrated compression together with the encryption, thus saving space, especially important when files are sent over frequently congested internet connections. The compression is possible by logically splitting the file in blocks, compressing and encrypting those blocks separately. The benefit of this block-wise method is that large encrypted and compressed files may be shared over networks and accessed using direct access methods without the need of transferring the full file and decompress it. Each block may be transferred over the network using the underlying transfer protocols ability to perform compression.

This model of file encryption with an embedded file header is also well suited for usage with USB memory tokens and other portable storage containers, because regardless of the file system used on the storage media, all necessary information for the encryption and decryption is included in the file, i.e. the data and the key information is kept as a single unit and cannot accidentally be lost or mixed-up between files.

The file header contains as described above double hashes of the file data; one hash of the encrypted data makes it easy to verify the integrity of file contents, and the other hash of the unencrypted data makes it possible to eliminate redundant copies of files containing the same data. The unencrypted (or clear text) hash may be used together with antivirus systems for storing hashes of scanned files even though the files are encrypted using different keys and the keys are not available to the antivirus system. Those hashes may also be used to track company 'illegal' or unwanted files, like pornographic files, that may be downloaded from the public internet and stored encrypted locally.

Files may be accessed sequential or at random. For sequential access, compression, encryption and calculation of hashes is very straightforward and done in the following order during file creation;

1. Reserving space for the header.
2. Calculating clear text hash.
3. Compressing data.
4. Encrypting data.
5. Calculating encrypted hash.
6. Updating the header with hashes.

To permit direct access, files are handled in a different way. As mentioned in a section above, the file is logically divided in blocks where each block is compressed and encrypted as a unit. The process works the following way when a direct access file is created.

The header is created with empty hashes.
For each logical block, the clear text hash is calculated and logically added to the clear text hash in the header.
The data in each logical block is compressed individually; padding the rest of the block with compressible padding characters (e.g. null characters).
Only the actual data is encrypted, so the ending part of each logical block is left unencrypted and thus possible for transport protocols to compress since it will contain the padding.
For each logical block, the encrypted hash is then calculated and logically added to the encrypted hash in the header.

This management of the hashes makes it possible to perform direct data modifications in the file without corrupting the hashes.

When data is to be modified, the flow is;
The original logical data block is read from the file.
The encrypted hash is calculated for that block and logically subtracted from the encrypted hash in the header.
The data block is decrypted and then decompressed.
The clear text hash is calculated and logically subtracted from the clear text hash in the header.
For the new logical data block, the clear text hash is calculated and logically added to the clear text hash in the header.
The data in each logical block is compressed individually; padding the rest of the block with compressible padding characters (e.g. null characters).
Only the actual data is encrypted, so the ending part of each block is possible for transport protocols to compress since it will contain the padding.
For each logical block, the encrypted hash is then calculated and logically added to the encrypted hash in the header.

The two hash values (encrypted and clear hashes) may be implemented as a logical sum of all hashes for the individual blocks (as in the description above). In this case, when any block is to be modified, the old hashes are first logically subtracted from the hash fields and then the new block hashes are logically added. The requirement is that the logical additions and subtractions is a way to perform a type of arithmetic calculations on hashes such that the order of adding or subtracting hashes does not impact the final result. Ordinary addition will work, but the design accepts any other calculation methods fulfilling this requirement.

A different way to implement the hashes is to use a table of hashes with as many entries as logical blocks in the file. It may be easier to maintain integrity using this solution, but the solution also consumes extra space. The advantage with individual block hashes is that delta detection and maintenance is possible to implement on an intelligent storage device by using these hash tables only.

Integrity flags in the header are used to keep track of when files are being updated, so if the computer suddenly hangs, the integrity can automatically be checked and recalculated after restart.

Local hash tables are also updated with the calculated file hashes. The mirroring, synchronization, backup and indexing services described later use these tables.

EMBODIMENT INDEXING FILES: Files are indexed in a way that makes it possible to keep track of multiple copies of the same files without storing redundant information. These indexing files are stored on the backup media (like server or removable/external disk). The index block contains information of file names and hashes for unencrypted and encrypted information. These hashes are then used to identify the data portion of the files. The data parts are stored in separate locations identified by the hashes only. Since the file contains all necessary information to decrypt the file, data can be restored even if the index information is lost. The indexing information is used to connect logical names in directories and/or for different time periods with the correct data content.

Partial or full copies of the indexing information may exist on the local computers to enable fast searches of backups without the need to have access to the backup media.

Using a shell extension in Microsoft Windows, or other similar techniques for other operating systems, the index files may be interpreted and shown in a way such that the user has no need to understand the underlying technique. Files are presented and used as they normally are used by the operating system.

Using a shell extension it is also possible, and very simple to implement a 'filter' permitting the user to choose some date and time in the past and "rewind" the content of storage locations such as directories and files to what the files looked like at the selected time and date. The shown directories and files can then be re-saved (i.e. restored) to other locations, or even the same location and used from that point on. When implemented in similar way as the ordinary operating system implements folders and files, the restore process will be easy to use even for inexperienced users.

EMBODIMENT ELIMINATING IDENTICAL COPIES: The indexing of files is, as previously mentioned, based on hashes identifying the file data and the encryption header. There are as mentioned hashes both for clear-text data and encrypted data. This makes it possible, using the hashes, to eliminate duplicate copies where the binary content is identical using the encrypted hash i.e. identical content protected with the same key.

The elimination also works when the data before encryption is identical, but the encryption is using a different symmetric key. This is possible using the clear-text data hash together with the public key information. Only the necessary header information has to be recreated to reflect the correct key information. The rest of the file data may be used in the same way as differential backups are handled, so the difference from the other file is only the header. In this way, the invention makes it possible to store only one copy of a file, even though the file may be a copy from a different computer or user and consequently is encrypted using a different symmetric key.

EMBODIMENT BACKUP: Based on the above indexing description, the invention can further be used for disk-based backup applications and is elegantly simple in theory: "Back up less data". The invention creates point-in-time copies of data using the above described indexing of files, but significantly decreases the amount of data it writes to disk by eliminating duplicates and only writes changes to already backed-up files. A shell extension as explained at another section of this application might be used to implement this point-in-time functionality.

The underlying technology parses files and breaks them into chunks of configurable size that can be examined individually for changes, even for encrypted files, encrypted in a way as described in another section of the application. However, this technology works well only when files are encrypted using the same symmetric key, so differential file contents cannot be stored for a file with identical unencrypted contents if the file is encrypted using a different key.

In the case the whole file is encrypted with a different key it has to be fully backed-up, but later backups may be differential for this file. An alternative way is to create a set of double headers; one for the component encrypted with the first key and the other for the component created using the different key, but such an implementation is somewhat complex to implement and the gain may be too small to actually be beneficial to implement for many types of files.

All of the above embodiments are possible since all files have a set of public key information in the header. In one embodiment, all public key information are created targeting the same group of users, and in this case, there is no need to recreate the header for backups when different symmetric keys are used for encryption since the header already contains key information necessary to give access to the symmetric key for the same group of people even if the files are encrypted on different computers. In other embodiments, there may be a different set of users having access to the file depending on what computer it has been created on. In those cases when files are encrypted using different keys, for each duplicate file, there is a delta file created containing only the new header with the correct key information for that file's backup purpose.

FIG. 4: In this drawing can be seen the structure on the backup server. In metadata container X10 (may symbolize files in a directory structure, a database or another container type) there are references to all files that exist and previously existed on a computer. Each file (entry in 400) has a description of all recorded versions (410, 415, 420). Each such metadata contains attributes like originating device, folder name, version, time stamps, thumbnail information and other search information describing the instance of the file that exists or existed at a specific earlier time. It also contains hash information connecting this info with the file data. In the object data container all unique files are stored (X11) in such a way that each unencrypted binary representation only has one copy meaning that several copies of the same file encrypted with different keys are reduced to a single copy as described in another section. This figure shows how different versions of files are stored. The base version 1 (455) stores the complete file. Version 2 (460) contains difference information based on version 1 and only the different data from that version. Version 3 (465) is a complete file and Version 4 (470) contains difference information based on version 2 and only the different data from that version.

FIG. 5: Shows details of the structures used for storing backups. The metadata container (500) contains information about file directory information (505) i.e. the information found in the directory of the source location. There is also a hash (510), which directly points out the backed up data in the object data container (525). There are also valid times indicating when the file was first detected (515) and when the file was detected as no longer present (520). This ending date and time information is set whenever the contents of the file is detected to be modified, or when the file is detected as removed. This valid time information is used to view historic contents of directories at specific times.

The object data container (525) contains the backed up data (files), stored under the given name, the hash of its content, or actually the hash of the unencrypted content together with the encrypted hash when encryption is used. Using this method, duplicates will be eliminated automatically, since a duplicate will have the same name (hash) as its original. There is also information about if this is a full copy or a differential copy (535) and in such case the base version for the differences. Since same file contents may be stored with different header information, the header may be stored separately (540). Then the backed up data is stored (545). For differential backups, only the differing blocks are stored with necessary merge information.

The object data container (550) shows a sample of two files stored as full backups, and two files stored as differential backups. Files A and B are full backups and are each composed of data blocks A01-A07 respectively B01-B07. File C shows a differential backup based on file B with only two blocks that are different (block 1 and 7). Finally file D shows a differential backup based on file C with only two blocks different (block 2 and 7). The complete contents of those four files can be seen in (590).

Embodiment Compression:

FIG. 7: Provides more details for how the compression is implemented.

In (710) a sample of two data blocks is shown, first compressed and filled with padding characters and then the data (712, 716) is encrypted but not the padding (714, 718). As seen, different compressed and encrypted information uses different space (712 vs. 716). In an ordinary encrypted sequential file (720) the padding is never inserted during this process, so the possibility of determining sizes and offsets in the file are quickly lost without decrypting the whole file before accessing it. Depending of encryption methods, there may have to be some padding (730) in the last block in order to use block wise encryption. This type of files cannot be shared for update in networks or accessed for update simultaneously by multiple users.

To achieve multi user access, compression can normally not be used since the access must permit direct addressing to specific positions in the file. In the current invention, direct accessing is possible on encrypted blocks the following way;

Assume there is a block size of 512 bytes and byte 40000 should be changed in a file. First the block is read and decrypted (at offsets 39936-40447). After changing the byte at offset 64 in that block, it is encrypted again and rewritten.

In (740) another way to look at sequential files is described where the file is divided into blocks of fixed size and for each block it is compressed and encrypted. Each data block (742-744, 746-748, 750-752, 754-756) starts at its correct position, and since the padding (744, 748, 752, 756) is still there, such data blocks are compressible during the transfer between computers. They are also compressible by the underlying operating system if it supports compression. Larger blocks permits better compression and therefore, this example uses the larger block size of 16384 bytes. The same byte at offset 40000 is to be changed. With the block size of 16384, the block at 32768-49151 (750, 752) has to be read. This block is transferred over the network and the network protocol can compress the ending padding (752). Then the block is decrypted and decompressed locally on the computer. In this block the byte at offset 7232 is then updated. Finally the data is compressed, padded and encrypted such as the padding is left unencrypted and compressible. While writing back the data, network compression takes care of the padding.

As can be seen, the method described for (740) enables direct access to large network files without the need to transfer the whole file to decrypt it and still permitting compression of data. This function also permits simultaneous multi-user access from different computers to same files where record locking over the blocks is used to assure the functionality.

EMBODIMENT TABLES CONTAINING HASHES AND FILE INFORMATION: Based on the indexing description above it is very useful, but not required for the invention to work, to create tables containing file hashes connected to file names and locations pointing to where those files exists on local fixed and removable storage media as well as for network media. Such tables are beneficial for the backup process and also for processes where searches for identical files are processed. Those tables are used for fast search of duplicates on the local computer. They are also used to quickly find files to send for backup without the need to scan all storage medias for changes at backup time. The file encryption driver maintains these local hash tables, or if the file encryption driver is not implemented, a separate program/component running in the background are updating them, watching for modifications to files on attached devices. These tables makes it possible for automatic mirroring, synchronization and backups to start whenever the required medias for the appropriate function is available without the need for time and computer resource consuming functions to start for preparing of this function.

This particular technique for indexing also works between different users and computers since the hash of the unencrypted data is used, even though the encryption keys may be different on the different storage locations. The indexing also makes it possible to track where files have been at different times as well as by whom a file has been modified by. Although not required, the index blocks may contain additional user identification information, version information as well as information about the files existence in time with that hash or content (i.e: date and time when that file with that specific content was first detected and when the file was detected to contain some other content). An additional advantage is that it is very easy for a user to locate any exact duplicates that may exist of a file regardless of their location on physical media and even in time.

In one embodiment, on local computers, there is a table for each storage media. This table may be stored both on the storage media as well as on a fixed disk on the computer. In the table, there is a description for each file, connecting the file names, locations, file sizes and hashes. The hashes may be clear text hashes, encrypted hashes or both depending on the implementation. Using encrypted hashes, files containing similar contents and encrypted using the same keys are identified and located quickly. Using clear text hashes the same files can be found, unencrypted or even encrypted using different keys. These hashes may also be used in combination with antivirus systems to control whether files once have been scanned or not to make faster scanning possible.

In other embodiments, the structures may be different, but the functionality of connecting file hashes with file names and locations to give fast access to information is the main concept.

In one embodiment there is a program, a service or another component that constantly is monitoring files for modifications. When modifications are detected—i.e. when files are created, deleted or modified, required hashes are calculated and the tables updated in the background.

In other embodiments, such calculations may be started at certain points in time or initiated by the user in order to keep control of the processor usage and disk load.

When attaching removable media, the media is scanned and file sizes and times are compared to stored values in the tables and indexes are recalculated when necessary. For new media, new tables are created as required, and depending on settings stored or not stored on the media.

EMBODIMENT USING HASHES FOR FAST ACCESS IN FILE SYSTEMS: File access speed can be significantly improved by using the hashes to create filenames of files stored in an ordinary file system. Metadata is used to connect the logical name of the object (file) to store. Several metadata files may target the same information i.e. the object stored under the name of its hashed value.

In one embodiment the metadata may reside in a specially designed file that offers flexible access and search possibilities to the attributes stored in the metadata. The correct hash identifies the data, stored as files named by their hash result in an ordinary file system.

The hashes of the data objects are first converted to a format with character representation appropriate to the file system. This can be made by converting the hash to names containing letters A-Z and number 0-9, some other characters or maybe restricting the filename to hexadecimal characters 0-9, A-F.

The presented examples are chosen to use the hexadecimal representation, and the file name may look something like AF72D98E2C08E0D69E4E if the hash is of 80 bits.

Storing these objects in one single directory in an ordinary file system will cause slow performance in finding files when there are many files and should therefore instead be stored by building a binary tree directory structure using two characters for each directory node. The design will be very fast by selecting an appropriate number of nodes that is sufficient for the number of objects to store. Let's say there are 1 million objects to store. Using only one subdirectory level, there will be roughly 3900 files (1000000/256) in each leaf-directory. Using two levels there will be roughly 15 files in each leaf-directory. The filename of the sample file stored in such a directory structure would be: [base directory] \AF\72\AF72D98E2C08E0D69E4E. In the leaf-node, the full hash is used in the filename, but it can be omitted since the leading characters AF72 were used in navigating the directory tree. If there are $10^{12}$ files there would be roughly 230 files in each leaf-node by using only four sublevels.

Using this directory structure it is very fast to search for a file. By knowing the name, just address the file directly, or by knowing the partial name, search from required level in the directory tree. Normally, there is no need to search for a file when the full name is not known since it has the name of the hash we are looking for.

This naming of files also has another benefit. It is very easy to verify the contents of all files in the file system by just scanning for files, and for each found file calculate the hash and compare the hash with the filename of itself.

By reserving some extra space in the file name (bits or bytes at the front or end of each filename), information can be stored about file compression, encryption or processing in another way, causing the hash of the full file to be different and therefore have to be processed differently. The hash may in this case reflect the contents of the file in its original state, while the extra information indicates what process needs to be performed to restore the file to its original state.

Differential files can be stored based on other files in a similar way by naming the file something like [full hash]_[base file hash] in the name. This information may of course be embedded in the file, but by composing the filename using those hashes, it is very simple and fast, by just looking at the filenames to find and retrieve files automatically during a restore process. The server that may be located at a distant location may automatically compose the restore information by collecting all needed files using the filenames only and never have to look at the file data, where the contents may be encoded in some way.

This server scenario may also include the hash of the file contents in its current state after the encoding process, such as encryption or compression. By doing this, the file name will contain the hash describing the files original contents as well as the hash of the encrypted file as it is stored in the file system. Using this second hash, programs scanning the files and directories in the backup can automatically verify the integrity of files by comparing the hashes of the files with the hash in its filename as previously described. In this implementation yet another but shorter hash in the filename may be used for hashing the filename itself such that the filename may be self-verified EMBODIMENT USING HASHES FOR INTELLIGENT BACKUP OF DATA: A very intelligent backup system can be created by using the hashes to create filenames as described above, combined with functionality to keep track of all files stored on backup media, like tables of hashes. The backup system will work with any type of object, and as a sample implementation, a system with several computers and one single backup media attached to one computer at a time is described.

In one embodiment the backup media, such as a removable storage unit, is attached to a computer with a backup program installed using the metadata and the hashing technique. During a preparation phase this removable storage unit is assigned to store backups from the computer, e.g. some specific directories, some specific files or a combination of these and/or other parameters. By copying all unique files the backup is then processed to the backup media excluding already stored files. Simultaneously, a metadata structure (file or database) is maintained on both the backup media and on the local computer. On the backup for backup purpose, and on the local computer for fast information retrieval of backed-up files and retrieval of information on what media they are stored.

Later, this backup media is attached to another computer and a similar setup process is performed on this computer. For this computer, another metadata database is created, describing the backup settings, the information file of this computer binds it to this backup media. Files are copied, but since the files are stored under the names of their data contents i.e. the hash, it is very fast for the backup program to identify already stored files on the media, and only copy missing files. The metadata of course is updated for all objects covered by the backup.

The same process is repeated for each computer included in this example. There will be a number of metadata databases but only one copy of each unique data object. It is fast to decide if an object already exists on the backup media by just testing for existence of the filename. Even so, it may be preferable to have a common table, database or data structure stored solely on the backup media, containing all hashes for those objects that are stored on the media. By loading this table at the start of the backup process, the decision of whether or not there are any missing objects on the backup media can be made much faster.

EMBODIMENT USING HASHES FOR INTELLIGENT MIRRORING OF OBJECTS: The hash tables described above may be used for intelligent mirroring of files. In this embodiment hash tables are used on each media, containing names and hashes for all files on that media.

After the initial setup of this functionality where there is defined from what source and to what destination the mirroring should take place, each file will be immediately mirrored (or after some delay set in the setup process). The mirrored place will contain a copy of the original location, and that copy will be maintained automatically.

Assume there is a USB or other removable storage device that is attached to the computer. If this device already is prepared, it will contain the hash table of its contents. When detecting this device arrival, the mirroring process will immediately load and verify the hash table from the device and after a fast analyze of both the hash tables, for the source and destination, start copying the missing files and update the hash table on the device.

This device can later be moved to another computer where the same process will be performed, thus copying only files not already existing, even when they are copied from another computer.

An option is to not store any hash or metadata information on the removable device in order to save space and just store it locally on the local computer, but then the device cannot easily be moved to another computer for updating of the files.

EMBODIMENT USING HASHES FOR INTELLIGENT SYNCHRONIZATION OF OBJECTS: The described methods above covering intelligent backup and mirroring of information using hashes may also be applied to an implementation covering synchronization of data. As mentioned in a section above, they are not limited to computer systems and files, but the presented examples uses the same setup as used in the backup system described above. Several computers share the same synchronization media, which may be, but are not limited to be, the same media as used for the backup process.

After setting up the system for synchronization, the same storing of objects and metadata may be accomplished as during the backup process. Unwanted redundant storage of copies is avoided. The added functionality is a description of contents such as folders, folder trees or other objects stored describing what to synchronize. This information may be stored on both the media and on the computer or only on the media or on the local computer depending on the implementation. Another added object is a database on the backup media containing the metadata for all objects covered by the synchronization. This database is common for all computers to be synchronized and is therefore unlikely to be stored on any of the local computers.

During the synchronization process, there will first be a backup step executed in order to preserve the contents of the computer in case the synchronization has to be reversed fully or partially. After the backup is completed, the synchronization starts, where the metadata information for the local objects such as files are compared between the computer, the common database and the backup database in order for the synchronization process to decide how to update both places to the latest version. During this process messages may be presented to the user if contradicting information is found for some objects.

Whenever the media is attached to another computer, the same process is started and the files are updated on both the computer and on the removable device.

The backup/synchronization media may be of any type of removable storage media like USB storage devices, fire wire attached storage, Bluetooth attached storage, network attached wired or wireless storage, or any other media. In one embodiment the user carries a portable storage device like a USB-token where information is synchronized when traveling between multiple work places such as home and the office.

Figure 8:
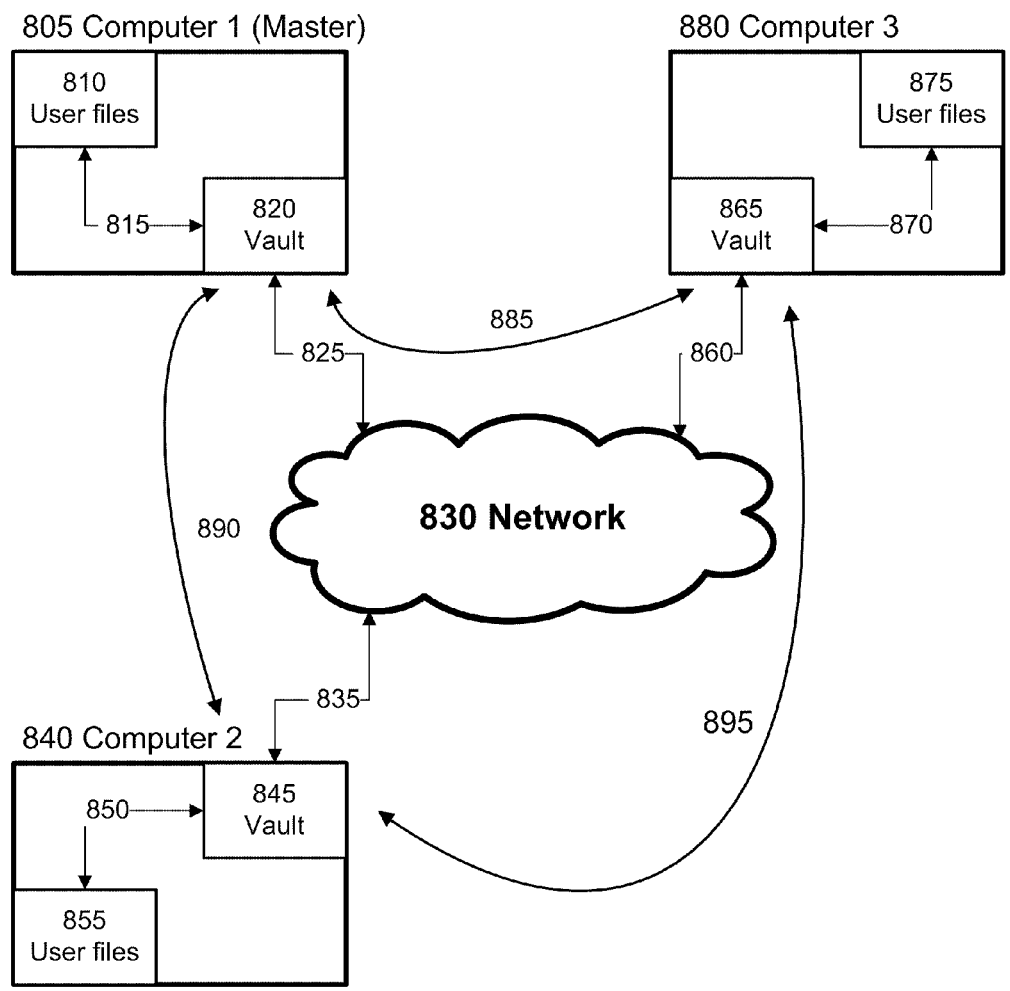
FIG. 8: This drawing describes a local network with three computers connected, where synchronization of data between the computers are used in combination with backing up information from all three to each of the individual computers.

Embodiment Mirror and Backup in Combination:

FIG. 8: In one embodiment the mirroring may be implemented in a small office where no dedicated server exists and there are no removable media to use. Mirroring is instead used internally between all connected computers directly within the network. Backups are also stored on all computers such that each computer contains a backup for every, or a selected set of attached computers in the network. E.g. in large network with many computers, small backup sets of computers may be defined in order to avoid large backup sets; i.e. a computer may be backed up to only two others, not to all others.

There are three computers (805, 840, 880) connected to the network (830) by connections (825, 835, 860). Communication is direct between the computers is in place (885, 890, 895).

One computer can be dedicated to be the master (805) such that all synchronization and backup from the others must pass that one, or another way is to define all to be peers and communicate directly between them (as in this example).

On each of the three computers, there are definitions of the areas to be synchronized and backed up (810, 855, 875). There are also definitions where the backup vaults are (820, 845, 865).

The backup will work internally on each computer between the defined area and the backup vault (815, 850, 870).

The mirroring will work directly between the computers by sending hashes and metadata between the computers describing changes to the structures. When necessary the data files (hashed file) are also transferred over appropriate connections.

Files and changes stored on one computer will immediately be synchronized to the others when they are connected. Any computer can be disconnected from the network and used on other places without any preparation. When they later are reconnected to the network, the mirroring and backup will start immediately and very quickly synchronize all to the latest state.

If files are deleted by mistake, the deletion will be mirrored to all computers, but since all computers also have a backup vault where files may stay for very long time and many versions of the file are stored, they can be restored regardless of whether the files are present or not in current directory structure or if the computer at that point in time is connected or not to the network. In one embodiment files can be made read-only in such a way that files cannot be deleted.

The synchronization itself may use communication by sending files to the other computers communication directories or by sending messages directly between the applications.

FIG. 9: Describes another embodiment where the computers are located on different sides of a firewall, (910, 940) on one side and (970) on the other. The different sides handle different type of information and the requirement is now to use encryption to secure data between the sections. Backups must be encrypted and it is preferable but not necessary to have the encryption driver installed because with the driver installed all files may be encrypted. Without the encryption driver the backup program/service will take care of the encryption and since the format of the header is identical for driver encrypted files and backup encrypted files, any computer may or may not have the encryption driver installed.

The common locations are shared between all three computers (914, 944, 974) where files stored will be mirrored to the other locations and accessible for all others and does not need to be encrypted (for protection from the other computer users). Those common areas are synchronized between the computers and (934, 964, 994) functions as backups.

There are private areas on each computer that will be backed up on all computers, and on those private files a private master key will be used such that no one else can decrypt the files. (913) is backed up on (925, 955) and (914) is backed up on (934, 964, 994). (943) is backed up on (961, 931) and (944) is backed up on (934, 964, 994). (973) is backed up on (988) and on the other side of the firewall on (928, 958). (974) is backed up on (934, 964, 994).

All backups are encrypted either by private keys or by a common key or a combination if additional keys are used.

Objects can be copied between the private and common areas (915, 945, 975) and there are direct communication between the computers either using files shares, or better directly over a reserved TCP-port or other direct or indirect communication channel.

On (910) files backed-up from (913) will be stored encrypted with a private key on (925, 955) and files from (914) will be encrypted using a common key on (934, 964, 994). The same applies for (943) with private key on (931, 961) and (944) with common key on (934, 964, 994). The same applies for (973) with private key on (988, 928, 958) and (974) with common key on (934, 964, 994).

The implementation works efficiently, automatically and securely where a smaller set of data can be easily shared.

With this function a notification with verification from the user may be invoked before any file leaves the local computer to be synchronized on the others, since a file may easily be copied to the wrong place.

COMMON DESCRIPTION: For mirroring, synchronization and backup, the media may be locally attached, attached in a LAN or attached over the internet. The transport of files may be differently implemented depending on the connection type. For locally attached media, the media may be an unintelligent storage device or an intelligent device, keeping track of locally stored files and metadata. In a LAN, in a server implementation, one way is to store files on shared volumes on the server, while another, more secure way is to have a server component as well as a client component running where the server component functions in a way similar to the locally attached intelligent storage media in such a way that files and commands are interchanged between the computers and server offering protection of the stored files such that any malfunctioning computer cannot damage the backup.

Over internet connections a similar client/server implementation as described above can be used. The connections can be direct between computers-storage servers over dedicated communication channels such as especially dedicated ports or by using communication by storing files containing requests and answers on commonly accessible connection points. Backups this way should be ideal for small workgroups spread out in areas and working on common projects for different employers.

Using some type of manipulation of the data like compression, encryption or delta-processing of files, the data transferred can be reduced in size as well as extra protected against information leeks when using the public internet as communication backbone.

EMBODIMENT IMPROVING DIFFERENTIAL BACKUP SOLUTIONS: As mentioned above, the functionality of differential backups is addressed. At a first look, it may be difficult to find much difference in functionality from existing solutions, but as is shown, there are significant improvements using the methods described above even in those cases where compression and encryption are not used. The following embodiment will now show some of the highlights.

In the metadata database (or container) all attributes, found in the directories for the files are backed up such as file attributes, sizes and dates. These attributes are for informational use only and not really needed for the recovery process. For each file and directory there may exist many entries in the database. There is one entry for each backed up version of a file. Together with this information there is also stored information at what time and date this file appeared and disappeared. Since this entry is valid for one hash (binary version) of the content, the dates gives us information of when files were modified, and when new entries were created in the database.

A process constantly monitoring the file system for changes and capturing each change may continuously update the metadata database. This process may also take continuous copies of modifications and store them locally in a temporary directory. The copies of changed files may also be taken at predefined time intervals.

When the backup device is attached, all those temporary files not existing on the backup media may be transferred and the metadata database merged.

When restoring files, the contents may be restored to a content that existed at a specific time, or that has existed over a time period, such that all files that existed at some point of time during that period can be restored to their latest version. A directory containing files may have been deleted at some time within such a period, but using described functionality, even the deleted files may be found and restored. For previous implementations of differential backups there is a problem that plenty of versions has to be merged to get a full image to restore, and when restoring such images, files and directories that existed at some point in time, but have since then been deleted are often restored. In current invention, since all files are stored under their hash names, no information is stored in multiple copies regardless whether they existed during different time periods, under different names or at different locations in the file system.

EMBODIMENT FOR FULLY AUTOMATED BACKUPS: For many users, the complexity of set up procedures for making a backup is too complicated or too time-consuming. Later when backups are to be taken there is a backup program to start, some commands to execute and some decisions to make that makes it to tedious to backup frequently. The same problem exists regarding the user interface to restore files. Very often, they are not designed in a way that seems natural to users that may be somewhat inexperienced in working with computers. This embodiment will greatly increase their ability to keep current backups, This embodiment is based on the previously described mirroring, synchronization and backup systems embodiment. There is now a dedicated process or service that is constantly running on the local computer, monitoring changes to the file system and keeping track of the changes. This service is constantly taking hashes of the local files and updating a local database. This process is also monitoring devices attached or removed and will start the predefined functionality automatically whenever the storage media is attached—without any user intervention at all.

When the device is attached, it is identified as a media for one or more of the backup, mirroring or synchronizing functions. The desired functions starts immediately without any noticeable impact for the user, where information of what is going on may or may not be presented as an information balloon in the tray like backup started and backup completed.

A removable device such as a blue-tooth or Wi-Fi device can be used. If so, the device will automatically take backups whenever the computer is within communication range. Using backups over the public internet this way, the user never have to make any more backup decisions and never have to loose a file.

This function may seem a bit scary since there is no need to perform any identification of the authority for the automated backup to start. If files are stored without any encryption or protection, the backup media has to be handled with extreme care since it may contain proprietary or secret information.

In one embodiment the files are encrypted before they are stored to the backup media. The local computer may be efficiently protected by other means, but the backup, synchronize or mirror media has to be encrypted. In this embodiment there is a common key used for the encryption. By using the same key for several computers, the non-duplicated storage that the solution offers will be beneficial. In order for this function to work automatically, the secret key may be stored on the local computer. i.e. the same secret key may be stored on all computers (in case of symmetric encryption). The backup media is secured by encryption this way in case it is lost or stolen.

EMBODIMENT USER INTERFACE: During the restore process the current invention offers a user interface integrated with the operating system user interface. Looking at Microsoft Windows operating system as an example, the restore interface is implemented as a shell extension where the backed up files are presented in an explorer view similar to the ordinary explorer view. Files can be dragged and dropped from the backup folder structure to any place on the local disk like moving files under the ordinary operating system. For files whose binary representation already exists locally on the computer (found easily using the hash calculation process) the restore is just a local file copy, while other files have to be retrieved from the backup media, either using the locally attached storage unit or by accessing the remote backup device using the network, internet or other communication method/device. Files will be restored in due time in the background.

At some point the user needs to restore files to a specific version of the file (version existing at a specific time). This is made easily by offering a time slider somewhere in the explorer window, for example on the right side of the toolbar. By dragging the slider to a specific time, all shown items will reflect the situation at that point in time. In an extended version it may be beneficial to have a start and end point in time and all files that existed within that time interval may be shown and are possible to restore.

As another extension to the normal shell, the user can right click on an item in the ordinary file system view, choosing backups and select to restore a specific version of that item either to the original location or to another location. In implementations where there are lots of local disk space there may be a local store of copies under the hashed names. Users can choose to restore files and directories to any version without the need to previously copy those to other locations, an action frequently performed by many users. This will save both valuable time for users and storage space.

In the modified explorer view and also in the normal explorer view it may be of interest to indicate what files that have copies on other locations on the computer as well as where they exist and if they are backed up. This can be performed in a similar way as the shortcut icons are tagged in Windows today, but with another symbol like for example a colored dot. By right clicking on such an object, all exact duplicates existing on the disk, and perhaps also on other media and backups are shown to the user in a submenu of this context menu. It may be possible to navigate to those locations where they are found by just selecting that submenu item.

The hashing technique in combination with this user interface offers extended search capabilities when searching backups for files. Assume the user is searching for a file, but do not remember the files name or where it was stored and even do not remember at what time it was stored on the computer. The only thing known is that at some place and point in time another file was present. The user can then search for this other file, finding where any of its different versions or if required a specific version has been present at different times. After changing to that directory (which may or may not exist now) and the user then sets the starting and ending time for that view to show every file that has ever existed on that location. From that point, files can be restored and investigated until the correct file is found.

EMBODIMENT EXTREME AND EASY TO USE SECURITY: Normally it may seem enough to have just one backup. As mentioned previously, the complexity of backing up the computer files scares many people to do it. With the solution of the current invention the back up can even be improved like what is described below.

In this embodiment a user have the need for outmost security and safety. One safe copy must always be in the security box at the bank office and the requirement is also that all backups must be immediately available in close proximity to the computer.

In this example, three identical backup schemes are scheduled, such as the above described versions, are set up. When the first backup is made, that device is disconnected and transported to the bank vault.

The next device is used for local backup and it is stored locally at the office.

The third device is used for backup at appreciate times, and then the third and first devices are interchanged regularly at the bank vault. By using this method, there is always a copy in the vault and there is always a copy at the computer site.

By using an intelligent local attachable device, for example where the server component is integrated in the device, there is no risk of any virus or other malicious program to destroy data on purpose or by accident. This is possible since there is never a need to remove any information from the device. All files stored under the hashed name are never to be removed. Likewise, the metadata files must never be removed. The only thing updating them is when a specific version has disappeared, i.e. been changed or removed, and then the only information needed to be added is the time for when that version ceased to exist. The device may be protected by hardware or software such that files may never be removed from the device by any commands from any attached computer or another device. There may be a physical switch or the requirement to enter a code physically on the backup device before any such data deletion can be made.

EMBODIMENT DEVICE FOR PROTECTING BACKUPS: This invention is in its first place designed to meet the requirements and functionality described above in this document.

The design of the above described invention permits very easy management of the system, but is in some embodiments vulnerable to computer malfunction or other malfunction, viruses and other malware and also to incorrect user operation that can be made by mistake.

This embodiment describes a device that secures the backups taken concerning those possible threats. Threats it cannot protect against are physical destruction, electric shocks, excessive temperature or gravity shocks, radioactivity, powerful magnetic fields and other such extreme conditions. The design of this invention protects against possible threats from connected computers and devices in the following way.

One function of the device is that it intelligently protects by built in hardware or software such that information that has once has been stored can never be modified or removed. I.e. All, at any time, stored information can always be retrieved, new information can be stored, but stored information can never be removed or modified in any way except at specific instances when the (authorized) user has proved that the intention really is to delete information.

The embodiment of this invention without encryption or compression of files works as follows;

Locally on the computer, all files to be stored on the backup media are hashed, and the hash itself is used as the name of that file. Before naming a file, the hash is reformatted to a file name format appropriate to the system like a conversion to hexadecimal characters. Other conversions may be better than hexadecimal like converting to all letters A-Z, digits 0-9 and some special characters to keep the length of the generated name shorter. In this example embodiment there is no account taken to whether the file system is capable of handling the amount of files or objects created or not. Since this embodiment targets a new type of hardware or software device, assumptions are made that this new type of device is capable of handling the amount of objects that will be created, either by the internal file system design or by using some type of table or database to manage this requirement.

The filename should identify files by their contents. Encrypted, compressed or otherwise manipulated files do preferably use a header within the file like the previously described, where in case of manipulation like encryption or compression, the clear text hash and the hash of the encrypted or otherwise manipulated data is found. For encrypted files, necessary key information should be there such that files can be decrypted and also validated to be decrypted for certain users. Backed up data targeting objects with same binary contents for different users may be encrypted using different encryption keys. Such objects may be stored with different header information but otherwise in one instance—the same information representing the data itself. Since these kinds of manipulations are made at the backup time, decisions may be done to not perform such optimizations at all to keep the backup process as clean as possible. To enable delta detection between versions of objects, the objects may be accompanied by hash tables where hashes are targeting blocks of data in the objects describing the hash of those blocks as the hash of the clear-text block as well as the hash of the encrypted block. Using this method delta analysis and reduction may be applied even though the blocks themselves are encrypted using different keys.

In one embodiment the filenames may be composed of one or several hashes, where the first/leading hash in the name always is the hash of the file as it would be if the file were, not encrypted, not compressed and not manipulated in any other way. In this way, all references in the metadata can always target the real and not processed contents of backed up objects. When the filename contains more than one hash, a short hash for self-verification of the filename should also be included in the name.

A file containing differences should always contain the hash of its base version in the name.

A file containing a header should always contain the hash of the full file including the file header.

The file header should contain the hash of the clear text file. It should also contain the hash of the encrypted, compressed or otherwise managed file data. The header of encrypted files should contain necessary information such that keys may be handled and validated for existence. Different used possible asymmetric keys are for example user keys, group keys and recovery keys.

As the hashed file is transferred to the backup media to be stored and since the hash is naming the file, and the hash uniquely identifies the binary representation of that file, the filename uniquely identifies the file. Files with names not derived correctly cannot be requested to be stored. Because malfunction on computers may cause that hashing and naming procedure to fail, there should be verification on the backup device that the hash of the file is correct i.e. that the hash of each object corresponds with the objects name. If this is fulfilled, there can never be any request to replace an existing file with different contents. On the contrary, an exact copy of a file, but processed in another way can be stored, even if this is not suggested.

A useful function that should be implemented although not required is a list of all hashes of objects on the device. This list should be possible to retrieve by the computer.

A metadata object is created containing the attributes of the file as found in the directory e.g. name, file attributes, date and time for access, creation and modification, file size and other appropriate attributes. File attributes like objects stored together with the file such that some file systems support are also added with the metadata, or depending on the implementation and data type, with the data object. Such attribute objects may alternatively be hashed and stored in a similar way as the file itself with the name set to the attributes name and the hash stored in the metadata.

The metadata object should also contain two more fields. The starting time; the date and time when the file was first seen at the computer with that specific content/hash. The ending time; the date and time when that specific file (with that hash) disappeared from the computer i.e. was removed, replaced, altered or moved to another name or location. The metadata itself should also be self-verifiable like the data objects When backups are taken, locally stored intermediate backups may be stored on the backup device. For those files that have disappeared and no longer exist in that specific version on the device, the complete metadata can be stored, but for files still existing on the computer the ending time must be left empty. This ending information should be recorded locally on the computers when files disappear so it later can be sent to the back up device. Alternatively, at next backup instance, information about files missing files may be requested from the backup device. The computer may then be searched to se if those specific files still exist. When writing new metadata end time information, the previously stored metadata may be updated, but a better way is to store completely new metadata info with only ending time, but a name such it is easily found. When new metadata is created for a file stored under identical path and name, this end time is not necessary to store for the previously stored file, since the start time of the new file will automatically indicate the end time of the previous file.

The metadata may be stored under the following key; Computer, path, file name, starting time and ending time. The separate ending time metadata objects, when the ending time is written a complete but empty metadata record is written with the same key and also the containing the correct ending time.

Metadata should be hashed in order to prevent false storing of information caused by malfunction. This hash is not required to be stored on the backup media, but may be stored for verification purposes. If stored that way, all information stored on the backup media may automatically be validated at any time by functionality on the device itself. All files stored under names of their hashes are just opened internally by the controlling process of the media. Their hashes are calculated and compared to relevant parts of their filenames. E.g. the metadata filename may be [name] followed by [hash] of the previous [name].

As mentioned, metadata may be self-verified, but only when the original hash or another internally calculated hash by the backup device is calculated and stored together. As an alternative, the metadata may be stored under the name of its hash by same method as the file data. A separate function on the device may, during the powering up, build up the searchable index using those files. This is the most robust solution.

The file system organization within the backup device does not need to be like existing file systems. In this current application described functionality assumes that many files can be stored on the same device offering fast access but have no other requirements of the file system on the device. In other embodiments the file system may be of some suitable construction having an ISAM-like or binary-tree like design. In yet another embodiments it may be of not here mentioned or not yet invented methods.

In one embodiment the backup device does not permit removal or modification of stored data.

In another embodiment the backup device may have a physical switch that permits the user, experienced or other separately authorized people to temporarily disable the data protection such that backed up data may be removed. If so, it should be protected in such a way that it is impossible to switch the device to the destructible/fragile mode by mistake.

In another embodiment such a switch requires authentication like using a pin code or other identification process.

Other embodiments involving encrypted and compressed files exist, such as described above.

In one embodiment the device is software running on a standard computer, dedicated or not for this functionality, using ordinary storage devices/medias for the actual backup objects.

In another embodiment this computer with software is, with the storage media itself, a closely integrated solution of hardware and/or software.

In one embodiment this integrated device, is a device with some commonly available storage media like a hard disk or flash-card.

In another embodiment this device easily permits the storage media, like a hard disk, to be replaced by the user.

Below are some details in one embodiment of how filenames for data objects/files may be constructed. This design is not required, but merely serves as an example of points that may be taken care of during the design phase. In this embodiment, the following notification is used;

[HASHC]=Clear text hash—hash of the file in its unencrypted/not processed form.

[HASHD]=For files with a header; Hash of the current file contents excluding the header.

[HASHVER]=Hash of the file in its binary representation on the disk, encrypted, compressed and otherwise processed with the inserted header. This hash is used for self-verification of the file.

[HASHBASE]=Hash of the base version of a file for incremental backups with modifications added to a base version.

[HASHNAME]=Hash of the other components of the objects filename.

For a complete object, which is not processed in any way, the name is only [HASHC] and nothing more. [HASHVER] is the same as [HASHC] for such an object. The device can directly verify the name by itself.

For a processed object like a compressed or encrypted object, the name should contain [HASHC] first to order the object in the directory structure. Then [HASHVER] for verification of the object itself. The [HASHC] may also be self-verified in the case of compression only by internally decompressing the file during the verification stage, but when encryption is used, no such self-verification is possible because, by security reasons, keys should not be available internally on the backup device. In any case, the name should give an indication that the file contains a header. Then finally [HASHNAME] for self-verification of the filename is in the name.

For an object describing a difference based on another version, which may be a complete version or another difference, a header must be included describing what blocks has to be altered from the base version together with the altered information regardless of encryption or other processing. The name should contain [HASHC] first to order the object in the directory structure. Then [HASHVER] for verification of the object itself. Then [HASHBASE] must be present to enable automatic localizing of the base version and finally [HASHNAME] for self-verification of the filename.

The header inserted in the file should also contain hashing information like [HASHC], a hash of the object data as stored and a hash of the header itself. This information can later be used for recovery of the device itself, like reconstructing file and directory structure by using file data itself.

DETAILED DESCRIPTION OF ONE EMBODIMENT OF A DEVICE FOR PROTECTING BACKUPS: This detailed description will exemplify how the invention can be created using one embodiment for a standard computer, PC compatible running a version of Windows and a service implementing the functionality of the described invented device. The assumed storage location for storing all backups is under the mount point D:\ where there are two directories created, one for the data files; D:\DATA and one for the metadata files D:\META. The communications with the service from clients are through a common server mount point \\SERVER\MOUNT where files with requests and responses are stored. For this embodiment the functionality of full backup of files and differential backup of files in combination with compression has been included. The directory structure is a b-tree structure under the corresponding root directories with 2 levels. For the simplicity of the description all file hashes are assumed to be 32 bits only, creating file names using 8 hexadecimal characters. File name hashes are assumed to be 16 bits. All data files will have extension .DAT and metadata files .MET. For headers and metadata, only fields and data needed for the described functionality is included in the description.

FIG. 10A; Shows how computers (1010,1020) can be connected using wired (1015) or wireless (1025) connections to a storage device (1000). This device contains a communication area (1001) accessible with full access rights for the clients.

The device have full control over the secured storage for metadata (1002) and file data (1003) for which clients have no access, or only read access. A physical switch (1017) connected to the device for protecting backups (1000) can in one embodiment control the ability to modify or delete stored objects. Authorization to delete or modify stored objects can in a different embodiment be given by an authorized person by entering authorization data such as a PIN or password in a user interface (1090) controlled from the device for protecting backups (1000). In one embodiment, either activating the switch (1017) or entering authorization data such as PIN or password through the user interface (1090) will activate ability to delete or modify stored objects. In one embodiment both the switch (1017) and authorization data entered through the user interface (1090) must be given to activate the ability to change or delete stored objects.

FIG. 10B; Shows how one computer (1060) is connected direct (1065) to the storage device (1050) while another computer (1070) is connected through a firewall (1075,1080,1085) to the storage device. Since the communication uses a public communication area for the clients, there is no special configuration requirement needed for the firewall-separated computer (1070) to access this area. A physical switch (1067) connected to the device for protecting backups (1050) can in one embodiment control the ability to modify or delete stored objects. Authorization to delete or modify stored objects can in a different embodiment be given by an authorized person by entering authorization data such as a PIN or password in a user interface (1090) controlled from the device for protecting backups (1050). In one embodiment either activating the switch (1067) or entering authorization data such as PIN or password through the user interface (1090) will activate ability to delete or modify stored objects. In one embodiment both the switch (1067) and authorization data entered through the user interface (1090) must be given to activate the ability to change or delete stored objects.

FIG. 11; Shows how one file can be stored compressed and non-compressed so that the references to this file are not dependant of the actual format the file is stored under. The file (1100) has a clear text hash of 0x12345678 and can always be found using this hash. The file data is (1101) and when compressed (1103). The following different types of files may reside under D:\DATA;

Full backup, not compressed (1150). The file name is [HASHC]. E.g. a file with hash 0x12345678 (1102, hash of

1101) will be named 12345678.DAT. The full path to this file will be D:\DATA\12\34\12345678.DAT (1150).

For the same file but the compressed version (1160), the binary representation will have a different hash, [HASHD] in this example 0x13572468 (1104, hash of 1103). There will also be a header inserted. The hash of the complete file including the header will be [HASHVER] 0x87654321 (1106, hash of 1105). The header contains [HASHC] and [HASHD] (0x12345678 and 0x13572468). The hash [HASHNAME] of the complete filename "12345678_87654321" is ABCD (1108, hash of 1107). The filename will then be 12345678_87654321_ABCD.DAT and the full path to this file will be D:\DATA\12\34\12345678_87654321_ABCD.DAT (1160).

Regardless of in what format this file is stored, it can always be found at directory D:\DATA\12\34 searching for the file "12345678*.DAT", where * stands for possible wild cards.

FIG. 12; For another file we have the complete filename built the same way and with a file hash of [HASHC]= 0x23234545 (1202, hash of 1201) the full filename will be D:\DATA\23\23\23234545.DAT (1250).

For this file to be compressed, where the [HASHD] is 0x45456767 (1204, hash of 1203) and [HASHVER]= 0x45645678 (1206, hash of 1205) the contents in the header would be 0x23234545 and 0x45456767. With the name hash of "23234545_45645678"=EFAB (1208, hash of 1207), the full filename will be D:\DATA\23\23\23234545_45645678_EFAB.DAT (1260).

If this file was stored as a differential file based on the first file (0x12345678) the contents would be (1211) as differential data for (1201) applied to (1209), (i.e. [HASHD]= 0x54542323 (1212, hash of 1211) and [HASHVER]= 0x67656765 (1214, hash of 1213) and hash of "23234545_67656765_12345678"=ABAB (1216, hash of 1215)); contents in header [HASHC and [HASHD] and [HASHBASE] (1210, hash of 1209)=0x23234545] (1202), 0x54542323 (1212) and 0x12345678 (1210). The full filename is D:\DATA\23\23\23234545_67656765_12345678_ABAB.DAT (1270 based on 1150).

Finally this file could also have been stored as a compressed differential file, but this format does not differ from the differential non-compressed format since the differential and compression functionality are implemented at the same level, i.e. it is only two different ways to describe the differential information. As complete sample the stored file would have been, as a compressed differential file based on the first file (0x12345678) the contents would be based on ([HASHD]= 0x54541818 (1218, hash of 1217) and [HASHVER]=0x67651231 (1220, hash of 1219) and hash of "23234545_67651231_12345678"=ABFA (1222, hash of 1221)); contents in header [HASHC] and [HASHD] and [HASHBASE]=0x23234545 (1202), 0x54541818 (1218) and 0x12345678 (1210). The header would also contain info that compression was used. The full filename is: D:\DATA\23\23\23234545_67651231_12345678_ABFA.DAT (1280 based on 1150).

Regardless of in what format this file is stored, it can always be found at directory D:\DATA\23\23 searching for the file "23234545*.DAT", where * stands for possible wild cards.

As seen in this description, the possible filenames for those two originally binary files are;
D:\DATA\12\34\12345678.DAT=full file (1150).
D:\DATA\12\34\12345678_87654321_ABCD.DAT=full file, compressed (1160).
D:\DATA\23\23\23234545.DAT=full file (1250).
D:\DATA\23\23\23234545_45645678_EFAB.DAT=full file, compressed (1260).
D:\DATA\23\23\23234545_67656765_12345678_ABAB.DAT=differential file (1270 based on 1150).
D:\DATA\23\23\23234545_67651231_12345678_ABFA.DAT=differential file, compressed (1280 based on 1150).

When searching for a file, the hash of the target is enough to find the file—if it exists. For these two files 12345678 (1102, hash of 1101) and 23234545 (1202, hash of 1201) is the required information. For file 23234545 in its differential form, the name also indicates what base file is needed (12345678), and that base file can be a file in any of these four forms. It can be the base file or refer to another base file.

It can also be seen that all of these four different formats are fully possible to automatically validate; i.e. that the filename is correct for the binary contents of the file. When a filename contains more than one hash, the second is always used for self-verification of the file contents and the last for self-verification of the filename. When more than two file hashes are present, this is a differential file, and the third always points out the base version. This naming convention also makes it impossible to store different binary contents using the same filename.

FIG. 13; The metadata is stored in separate files where each file contains the full specification of the original file name, the corresponding hash and the start and end date and times. In the filename specification a volume identifier can be found, which in current embodiment is the GUID Windows has assigned to this device, the full path specification from the root of that device and the filename of the file. E.g. the description for the first file (1300) with contents (1350);
Volume={7A3AB7D0-DE4F-11D9-A3C9-806D6172696F} (1351)
Path=Documents and Settings\lebi\My documents (1352)
File=Invention.doc (1353)
Hash=12345678 (1354)
Start=04/06/06 13.00.15 (1355)
End=05/06/06 11.25.33 (1356)
In this embodiment, the same file in its next version (1310) with contents (1360);
Volume={7A3AB7D0-DE4F-11D9-A3C9-806D6172696F} (1361)
Path=Documents and Settings\lebi\My documents (1362)
File=Invention.doc (1363)
Hash=23234545 (1364)
Start=05/06/06 11.25.33 (1365)
End=<na> (1366)
In this embodiment, if this file is later removed, a new metadata file is written (1320) with contents (1370);
Volume={7A3AB7D0-DE4F-11D9-A3C9-806D61726969F} (1371)
Path=Documents and Settings\lebi\My documents (1372)
File=Invention.doc (1373)
Hash=<na> (1374). This may also contain the actual hash 0x23234545, but this is not required.
Start=05/06/06 11.25.33 (1375)
End=05/06/06 17.25.12 (1376)
Each of those metadata files will uniquely point out the data by its hash (i.e. 12345678 (1354) or 23234545 (1364)) regardless whether the file is a full or differential version, compressed or not. The metadata itself is in this embodiment stored in one file for each instance. The above three metadata files will be contained in three different files. For each of those files, the contents are hashed and the hashes are used as filenames in a similar way as for the data files. The difference is that only one format is used and such; there is only one type of filename, which is self-verifiable in the same way as the data files. In our example, we have file names ABC34523.MET, 725A8DE0.MET and 19235678.MET. The full names of those files would be; D:\META\AB\C3\ABC34523.MET, D:\META\72\5A\725A8DE0.MET and D:\META\19\23\19235678.MET.

During startup, the service scans through all of the D:\DATA and D:\META with their respective subdirectories and validates all files. The service do also read all metadata files under D:\META and build a table containing all of that information. This table is stored in a documented format on the communication directory \\SERVER\MOUNT such that all clients may use it.

It must be noticed, that for a file with the actual contents of a valid header, an extra header must always be inserted so that the automatic validation of files will work correctly, because whenever a header is identified in a file, the automatic validation must know for sure that the header is not data within the file. The headers may also contain one hash of all the rest of the content in the header to make it more robust, but this is not required for the functionality.

Clients backing up data may place those files in the communication directory with correctly hashed names. The service validates names by hashes and also validates that possible referred base files exist before storing files. Metadata is also verified that the referred data files exist before they are stored.

Clients restoring data may use the hashed table (possibly after requesting the latest version of such a table). Requests may be for restoring specific files by name, location or hash. The service then copies requested metadata and data files to the common directory in order to service the request. The device may also offer read access to the internally storage areas D:\DATA and D:\META, thus avoiding the need to copy files to the communication area during restore processing.

In this embodiment, one device connected to different computers will create different device GUID's, because they are created on each computer at the instance a device is attached for the first time and recognized. Cross references may be implemented in the server, or a special cross reference/identification file may be created in the root of each volume when backups are first taken, thus avoiding different structures for the same media to be backed up when attached to different computers.

In this embodiment, the 'destructive' switch as described previously is 'switched' by an authorized user logging on and activating a functionality in the service enabling destructive commands sent by the communication directory to be performed by the service.

Destructive commands serviced by the service may include erasing specific files and or versions by name, date and place (directory and sub locations). Before erasing any data file, the device/service investigates that there exists no more references from metadata files or any differential file.

In some embodiments, functions may be included in the service that files created within specific time periods may not be erased. E.g. files created within the last 10 years may not be erased.

In some embodiments, the service may collect other information from metadata and headers, describing volumes, users, groups and other such information used for auditing purposes.

In some embodiments, this functionality; the PC with its operating system and running service may be integrated within one physical device.

In some embodiments it may be beneficial to implement a key to the hashing algorithm. Such a key can be stored fully accessible within the backup media since it has no purpose other than protecting the hashing=integrity control of the backups. If implemented, this same key needs to be used on every backup client taking backups. This key protects such that whenever the backup media is moved to another computer, that computer cannot by mistake change other computers stored structures since correct hashes for the other computers cannot be calculated without the correct key.

What is claimed is:

1. A device for securely storing objects comprising:
an object hashing system to generate a unique hash for a unique object;
storage media to store unique hashes and unique objects;
a control function to restrict an ability to alter or remove a stored unique object from the storage media by requiring a manual authorization from an authorized person for deletion of a stored unique object, in order to prevent alteration of the stored unique objects by malicious code or a malicious actor; and
an identical object detection system using the unique hashes to avoid storing in the storage media the already backed up unique objects, the identical object detection system using the unique hashes to enable detection of identical objects which are encrypted with different keys; and to create a delta file containing a new header with a second key information without storing another copy of the identical object.

2. The device of claim 1, wherein the storage media comprises a plurality of storage units, and further comprising upon detection of an addition or removal of a storage unit to the storage media, rebuilding internal tables, enabling dynamic connection of storage units.

3. The device of claim 1, further comprising:
an object self-verification function to verify an integrity of the unique object using the unique hash associated with the unique object.

4. The device of claim 3, wherein the object self-verification function is continuously active, and verifies the integrity of the unique objects to be stored and the already stored unique objects.

5. The device of claim 1, further comprising:
an automatic auditing function using time information and the unique hashes to enable auditing of addition and removal of the unique objects.

6. The device of claim 1, further comprising:
a network connection to be activated to receive the unique object for storage;
a power connection for the storage media, the power connection powering up the storage media when an active network connection is detected.

7. The device of claim 1, further comprising:
an authentication system to require authentication to activate a backup functionality, the backup functionality for storing a backup in the storage media.

8. The device of claim 1 wherein the control function comprises one of: a manual switch, an authentication-based switch, an authentication-based software control.

9. The device of claim 1, further comprising:
an object naming system naming the objects based on the generated unique hashes where the names of the objects, as defined by a generated unique hashes, uniquely identifies the objects.

10. A device for securely storing objects comprising:
an object hashing system to generate a unique hash for a unique object;
storage media to store unique hashes and unique objects;
a delta management system to detect a changed object, a changed object representing an update or change to an original object, and to generate a delta between the original object and the changed object and associate the delta with the original object; and an encryption driver to split a file into a plurality of blocks, and compress and encrypt the plurality of blocks separately, such that a change is applied on a per block basis by the delta management system, wherein the delta contains one or more changes to apply to the original object as a list of block numbers and associated block data, and the delta is saved as a delta object having a unique hash and including a pointer to a different delta object or to the original object.

11. The device of claim 10, further comprising:
the delta management system to disassociate the delta from the original object when the original object is removed, to recreate the changed object based on the delta and the original object, and to store the changed object.

12. The device of claim 10, further comprising:
a control function to restrict an ability to alter or remove a stored unique object from the storage media by requiring a manual authorization from an authorized person for deletion of a stored unique object, in order to prevent alteration of the stored unique objects by malicious code or a malicious actor.

13. The device of claim 10, further comprising:
an automatic auditing function using time information and the unique hashes to enable auditing of addition and removal of the unique objects.

14. A method of providing a backup system comprising:
receiving an object for backup;
generating an object hash, the object hash being unique for the object;
storing the object and the object hash;
receiving a request to alter or delete the object or the object hash;
detecting a changed object, a changed object representing an update or change to an original object;
generating a delta between the original object and the changed object and associating the delta with the original object; and
splitting a file into a plurality of blocks, and compressing and encrypting the plurality of blocks separately, such that a change is applied on a per block basis, wherein the delta contains one or more changes to apply to the original object as a list of block numbers and associated block data, and the delta is saved as a delta object having a unique hash and including a pointer to a different delta object or to the original object.

15. The method of claim 14, wherein the manual authorization comprises one of: a manual switch, an authentication-based switch, and a software tool requiring authentication of a user as an authorized user to be able to submit the request.

16. The method of claim 15, further comprising-verifying receipt of a manual authorization of alteration or deletion, prior to executing the request.

17. The method of claim 14 further comprising:
detecting a change in storage units associated with the storage media; and
rebuilding internal tables with the changed storage units, enabling dynamic changes to the storage media.

18. The method of claim 14, further comprising:
verifying object integrity based on the object hash associated with the object.

19. The method of claim 18, wherein the verification function is continuously active, and verifies the integrity of objects to be stored and the already stored objects.

20. The method of claim 14, further comprising:
auditing addition and removal of objects, based on time information and the object hash informati 21. The method of claim 14, further comprising:
powering the storage media upon an activation of a network connection to the storage media to enable receiving an object for backup.

22. The method of claim 14, further comprising:
using the unique hashes to avoiding storing in the storage media the already backed up unique objects.

23. The method of claim 14, further comprising:
detecting a changed object, a changed object representing an update or change to an original object stored in the backup system;
generating a delta between the original object and the changed object and associating the delta with the original object; and
storing the delta.

24. The method of claim 23, further comprising when receiving an authorized alteration or deletion:
detecting when the original object is removed, and recreating the changed object using the delta; and
removing the association between the delta and the removed original object.

25. The method of claim 23, further comprising:
associating metadata with the object, the metadata including versioning information regarding the object, thereby enabling retrieval of a latest version and any particular version of an object.

26. The method of claim 14, further comprising:
encrypting the object with a user-specific key prior to storing the object; and
associating metadata with the object, the metadata including a hash of an unencrypted version of the object, thereby enabling detection of duplicated documents across a plurality of storage media.

27. A system comprising:
a storage medium coupled to a network;
one or more a user computer systems coupled to the network;
a backup server coupled to the network to generate a unique hash for each unique object sent to the storage medium; and
an identical object detection system using the unique hashes to avoid storing in the storage media the already backed up unique objects, the identical object detection system using the unique hashes to enable detection of identical objects which are encrypted with different keys; and to create a delta file containing a new header with a second key information without storing another copy of the identical object.

28. The system of claim 27, wherein the user interface comprises one of: a manual switch on the backup server, a manual switch coupled to a user computer system, an authentication interface.

29. The system of claim 27, further comprising:
a delta management system to detect a changed object, a changed object representing an update or change to an original object stored in the backup system, to generate a delta between the original object and the changed object, and to associate the delta with the original object.

30. The system of claim 29, further comprising:
the delta management system to detect when the original object is removed, and to recreate the changed object based on the delta and the original object; and
the storage medium to store the changed object.

31. The system of claim 27, further comprising:
a user interface to request a manual authorization from an authorized person for the alteration or removal of stored object on the storage medium.

* * * * *